(12) United States Patent
Wright et al.

(10) Patent No.: US 10,405,050 B2
(45) Date of Patent: Sep. 3, 2019

(54) METHODS AND APPARATUS FOR MONITORING VIDEO GAMES

(71) Applicant: The Nielsen Company (US), LLC, New York, NY (US)

(72) Inventors: David Howell Wright, Safety Harbor, FL (US); Bradley R. Lawrence, Tampa, FL (US); Arun Ramaswamy, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/299,118

(22) Filed: Oct. 20, 2016

(65) Prior Publication Data

US 2017/0041675 A1 Feb. 9, 2017

Related U.S. Application Data

(63) Continuation of application No. 14/512,005, filed on Oct. 10, 2014, now Pat. No. 9,491,518, which is a
(Continued)

(51) Int. Cl.
*H04N 21/478* (2011.01)
*H04N 21/442* (2011.01)
(Continued)

(52) U.S. Cl.
CPC ......... *H04N 21/4781* (2013.01); *A63F 13/25* (2014.09); *A63F 13/95* (2014.09);
(Continued)

(58) Field of Classification Search
CPC ..... H04N 21/440263; H04N 21/64322; H04N 21/4622; H04N 21/25825;
(Continued)

(56) References Cited

U.S. PATENT DOCUMENTS 4,283,709 A 8/1981 Lucero et al.
4,677,466 A 6/1987 Lert, Jr. et al.
(Continued)

FOREIGN PATENT DOCUMENTS

EP 1043853 10/2000
EP 1043854 10/2000
(Continued)

OTHER PUBLICATIONS

Patent Cooperation Treaty, "International Search Report", issued in connection with International Application No. PCT/US2005/005079, dated Jun. 17, 2005 (3 pages).
(Continued)

*Primary Examiner* — Yassin Alata
(74) *Attorney, Agent, or Firm* — Hanley, Flight & Zimmerman, LLC

(57) ABSTRACT

Methods and apparatus for monitoring video games are disclosed. Example methods disclosed herein monitoring a data interface between a game controller and a game port of a game console with a monitoring device. Disclosed example methods also include determining whether the game console is operating a video game in a demonstration mode or an active play mode based on data detected by the monitoring device.

14 Claims, 18 Drawing Sheets

Related U.S. Application Data continuation of application No. 11/465,389, filed on Aug. 17, 2006, now Pat. No. 8,863,218, which is a continuation of application No. PCT/US2005/005079, filed on Feb. 17, 2005.

(60) Provisional application No. 60/563,531, filed on Apr. 19, 2004, provisional application No. 60/545,351, filed on Feb. 17, 2004.

(51) Int. Cl.
  *H04N 21/658* (2011.01)
  *H04N 21/8358* (2011.01)
  *A63F 13/95* (2014.01)
  *A63F 13/25* (2014.01)

(52) U.S. Cl.
  CPC ... *H04N 21/44204* (2013.01); *H04N 21/6582* (2013.01); *H04N 21/8358* (2013.01); *A63F 2300/206* (2013.01); *A63F 2300/535* (2013.01)

(58) Field of Classification Search
  CPC ......... H04N 21/42228; H04N 21/4126; H04N 21/2347; H04N 21/2408; H04N 21/2225; H04N 21/4781; H04N 21/44204; H04N 21/6582; H04N 21/8358
  USPC ... 725/132, 41, 32, 37, 116, 14, 105, 43, 49, 725/120, 109
  See application file for complete search history.

(56) References Cited

U.S. PATENT DOCUMENTS

| | | | |
|---|---|---|---|
| 4,697,209 A | 9/1987 | Kiewit et al. | |
| 5,421,590 A * | 6/1995 | Robbins | A63F 13/06 273/148 B |
| 5,481,294 A | 1/1996 | Thomas et al. | |
| 5,488,408 A | 1/1996 | Maduzia et al. | |
| 5,504,518 A | 4/1996 | Ellis et al. | |
| 5,572,246 A | 11/1996 | Ellis et al. | |
| 5,612,729 A | 3/1997 | Ellis et al. | |
| 5,621,454 A | 4/1997 | Ellis et al. | |
| 5,629,739 A | 5/1997 | Dougherty | |
| 5,697,844 A | 12/1997 | Von Kohorn | |
| 5,737,025 A | 4/1998 | Dougherty et al. | |
| 5,779,549 A * | 7/1998 | Walker | A63F 13/12 463/23 |
| 5,809,160 A | 9/1998 | Powell et al. | |
| 5,825,976 A | 10/1998 | Dorward et al. | |
| 5,872,588 A | 2/1999 | Aras et al. | |
| 5,918,223 A | 6/1999 | Blum et al. | |
| 5,974,299 A | 10/1999 | Massetti | |
| 6,005,940 A | 12/1999 | Kulinets | |
| 6,009,458 A | 12/1999 | Hawkins et al. | |
| 6,038,367 A | 3/2000 | Abecassis | |
| 6,122,403 A | 9/2000 | Rhoads | |
| 6,162,120 A * | 12/2000 | Takahashi | A63F 13/10 463/23 |
| 6,198,875 B1 | 3/2001 | Edenson et al. | |
| 6,201,474 B1 | 3/2001 | Brady et al. | |
| 6,208,735 B1 | 3/2001 | Cox et al. | |
| 6,272,176 B1 | 8/2001 | Srinivasan | |
| 6,330,021 B1 | 12/2001 | Devaux | |
| 6,353,672 B1 | 3/2002 | Rhoads | |
| 6,353,929 B1 | 3/2002 | Houston | |
| 6,459,803 B1 | 10/2002 | Powell et al. | |
| 6,513,161 B2 | 1/2003 | Wheeler et al. | |
| 6,577,346 B1 | 6/2003 | Perlman | |
| 6,590,997 B2 | 7/2003 | Rhoads | |
| 6,633,651 B1 | 10/2003 | Hirzalla et al. | |
| 6,647,548 B1 | 11/2003 | Lu et al. | |
| 6,675,383 B1 | 1/2004 | Wheeler et al. | |
| 6,678,392 B2 | 1/2004 | Powell et al. | |
| 6,704,929 B1 | 3/2004 | Ozer et al. | |
| 6,745,236 B1 | 6/2004 | Hawkins et al. | |
| 6,767,288 B1 * | 7/2004 | Kakuda | A63F 13/02 463/29 |
| 6,775,392 B1 | 8/2004 | Rhoads | |
| 6,901,519 B1 | 5/2005 | Stewart et al. | |
| 6,902,111 B2 | 6/2005 | Han et al. | |
| 6,968,564 B1 | 11/2005 | Srinivasan | |
| 7,038,985 B2 | 5/2006 | Ryal | |
| 7,509,679 B2 | 3/2009 | Alagna et al. | |
| 7,552,458 B1 | 6/2009 | Finseth et al. | |
| 7,631,327 B2 | 12/2009 | Dempski et al. | |
| 7,771,271 B2 * | 8/2010 | Walker | G07F 17/32 463/16 |
| 8,370,420 B1 | 2/2013 | Decasper et al. | |
| 8,863,218 B2 | 10/2014 | Wright et al. | |
| 2001/0011224 A1 * | 8/2001 | Brown | G16H 15/00 705/4 |
| 2001/0030667 A1 | 10/2001 | Kelts | |
| 2002/0010919 A1 | 1/2002 | Lu et al. | |
| 2002/0026635 A1 | 2/2002 | Wheeler et al. | |
| 2002/0056089 A1 | 5/2002 | Houston | |
| 2002/0059576 A1 | 5/2002 | Feininger et al. | |
| 2002/0059577 A1 | 5/2002 | Lu et al. | |
| 2003/0028779 A1 | 2/2003 | Rowe | |
| 2003/0054757 A1 | 3/2003 | Kolessar et al. | |
| 2003/0069002 A1 | 4/2003 | Hunter et al. | |
| 2003/0086341 A1 | 5/2003 | Wells et al. | |
| 2003/0110485 A1 | 6/2003 | Lu et al. | |
| 2003/0141994 A1 | 7/2003 | Ishioka et al. | |
| 2003/0157985 A1 | 8/2003 | Shteyn | |
| 2003/0177347 A1 | 9/2003 | Schneier et al. | |
| 2004/0015608 A1 | 1/2004 | Ellis et al. | |
| 2004/0058675 A1 | 3/2004 | Lu et al. | |
| 2004/0088721 A1 | 5/2004 | Wheeler et al. | |
| 2004/0268420 A1 | 12/2004 | Addington et al. | |
| 2005/0039020 A1 | 2/2005 | Levy | |
| 2005/0177361 A1 | 8/2005 | Srinivasan | |
| 2007/0266400 A1 | 11/2007 | Rogers et al. | |
| 2015/0031462 A1 | 1/2015 | Wright et al. | |

FOREIGN PATENT DOCUMENTS

| | | |
|---|---|---|
| WO | 0161892 | 8/2001 |
| WO | 03032639 | 4/2003 |
| WO | 2004051997 | 6/2004 |

OTHER PUBLICATIONS

Patent Cooperation Treaty, "International Preliminary Report on Patentability", issued in connection with International Application No. PCT/US2005/005079, dated Mar. 22, 2006 (4 pages).

Patent Cooperation Treaty, "Written Opinion of the International Searching Authority", issued in connection with International Application No. PCT/US2005/005079, dated Jun. 17, 2005 (3 pages).

United States Patent and Trademark Office, "Non-Final Office Action", issued in connection with U.S. Appl. 11/465,389, dated Jan. 22, 2010 (20 pages).

United States Patent and Trademark Office, "Final Office Action", issued in connection with U.S. Appl. No. 11/465,389, dated Jul. 22, 2010 (22 pages).

United States Patent and Trademark Office, "Non-Final Office Action", issued in connection with U.S. Appl. No. 11/465,389, dated Apr. 15, 2011 (22 pages).

United States Patent and Trademark Office, "Non-Final Office Action", issued in connection with U.S. Appl. 11/465,389, dated Dec. 7, 2011 (26 pages).

United States Patent and Trademark Office, "Final Office Action", issued in connection with U.S. Appl. No. 11/465,389, dated Aug. 30, 2012 (26 pages).

United States Patent and Trademark Office, "Non-Final Office Action", issued in connection with U.S. Appl. No. 11/465,389, dated Jun. 5, 2013 (24 pages).

United States Patent and Trademark Office, "Final Office Action", issued in connection with U.S. Appl. No. 11/465,389, dated Jan. 28, 2014 (26 pages).

(56) References Cited

OTHER PUBLICATIONS

United States Patent and Trademark Office, "Notice of Allowance", issued in connection with U.S. Appl. No. 11/465,389, dated Jun. 6, 2014 (18 pages).
Canadian Intellectual Property Office, "Office Action", issued in connection with Canadian Patent Application No. 2,556,697, dated Jul. 27, 2012 (2 pages).
Canadian Intellectual Property Office, "Office Action", issued in connection with Canadian Patent Application No. 2,556,697, dated Jan. 21, 2014 (3 pages).
Canadian Intellectual Property Office, "Office Action", issued in connection with Canadian Patent Application No. 2,556,697, dated Apr. 7, 2015 (4 pages).
United States Patent and Trademark Office, "Non-Final Office Action", issued in connection with U.S. Appl. 14/512,005, dated Sep. 16, 2015 (15 pages).
United States Patent and Trademark Office, "Final Office Action", issued in connection with U.S. Appl. No. 14/512,005, dated Apr. 1, 2016 (8 pages).
United States Patent and Trademark Office, "Notice of Allowance", issued in connection with U.S. Appl. No. 14/512,005, dated Jul. 8, 2016 (10 pages).

\* cited by examiner

METHODS AND APPARATUS FOR MONITORING VIDEO GAMES

RELATED APPLICATIONS

This patent arises from a continuation of U.S. patent application Ser. No. 14/512,005 (now U.S. Pat. No. 9,491,518), entitled "Methods and Apparatus for Monitoring Video Games" and filed on Oct. 10, 2014, which is a continuation of U.S. patent application Ser. No. 11/465,389 (now U.S. Pat. No. 8,863,218), entitled "Methods and Apparatus for Monitoring Video Games" and filed on Aug. 17, 2006, which is a continuation of International Application Serial Number PCT/US05/05079, entitled "Methods and Apparatus for Monitoring Video Games" and filed on Feb. 17, 2005, which claims priority from U.S. Provisional Application Ser. No. 60/545,351, entitled "Apparatus and Methods for Game Measurement" and filed on Feb. 17, 2004, and U.S. Provisional Application Ser. No. 60/563,531, entitled "Methods and Apparatus for Monitoring Video Games" and filed on Apr. 19, 2004. U.S. patent application Ser. No. 14/512,005, U.S. patent application Ser. No. 11/465,389, International Application Serial No. PCT/US05/05079, U.S. Provisional Application Ser. No. 60/545,351 and U.S. Provisional Application Ser. No. 60/563,531 are hereby incorporated by reference in their entireties.

FIELD OF THE DISCLOSURE

This disclosure relates generally to audience measurement and, more particularly, to methods and apparatus for monitoring video games.

BACKGROUND

Sophisticated processes for monitoring television and other broadcast media consumption have been developed. For example, television ratings and metering information is typically generated by collecting viewing records and/or other viewing information from a group of statistically selected households. Each of the statistically selected households typically has a data logging and processing unit commonly referred to as a "home unit." In households having multiple viewing sites (e.g., multiple television systems), the data logging and processing functionality may be distributed among a single home unit and multiple "site units," one site unit for each viewing site. The home unit (or the combination of the home unit and the site unit) is often in communication with a variety of attachments that provide inputs to the home unit or receive outputs from the home unit. For example, a source identification unit, such as a frequency detector attachment, may be in communication with a television to sense a local oscillator frequency of the television tuner. In this manner, the frequency detector attachment may be used to determine the channel to which the television is currently tuned based on a detected frequency. Additional source identification devices, such as on-screen display readers (OSDRs) and light-emitting-diode (LED) display readers, may be provided, for example, to determine if the television is operating (i.e., is turned ON) and/or the channel to which the television is tuned. A people counter may also be located in the viewing space of the television and in communication with the home unit, thereby enabling the home unit to detect the identities and/or number of the persons currently viewing programs displayed on the television.

The home unit usually processes the inputs (e.g., channel tuning information, viewer identities, etc.) from the attachments to produce viewing records. Viewing records may be generated on a periodic basis (e.g., at fixed time intervals) or may be generated in response to one or more predetermined events, such as a full memory, or a change in an input, such as a change in the identities of the persons viewing the television, a change in the channel tuning information (e.g., a channel change), etc. Each viewing record may contain channel information, such as a channel number and/or station identification (ID), and a time (e.g., a date and time-of-day) at which the channel was displayed. In cases in which the program content being displayed is associated with a local audio/video content delivery device, such as a digital video disk (DVD) player, a digital video recorder (DVR), a video cassette recorder (VCR), etc., the viewing records may include content identification (i.e., program identification) information as well as information relating to the time and manner in which the associated content was displayed. Viewing records may also contain additional information, such as the number of viewers present at the viewing time.

The home unit typically collects a quantity of viewing records and transmits the collected viewing records (e.g., periodically or in real-time) to a central office or data processing facility for further processing or analysis. The central data processing facility receives viewing records from home units located in some or all of the statistically selected households and analyzes the viewing records to ascertain the viewing behaviors of households in a geographic area or market of interest, a particular household and/or a particular group of households selected from all participating households. Additionally, the central data processing facility may generate metering statistics and other parameters indicative of viewing behavior associated with some or all of the participating households. This data may be extrapolated to reflect the viewing behaviors of markets and/or regions modeled by the statistically selected households.

To generate viewing behavior information from viewing records, the central office or data processing facility may compare reference data, such as a list of programs (e.g., a schedule of television programming or a television guide), to the viewing records. In this manner, the central office can infer which program was displayed by cross-referencing the time and channel information in a viewing record to the program associated with that same time and channel in the program schedule. Such a cross-referencing process can be carried out for each of the viewing records received by the central office, thereby enabling the central office to reconstruct which programs were displayed by the selected households and the times at which the programs were displayed. Of course, the aforementioned cross-referencing process is unnecessary in systems in which the identity of the program is obtained by the home unit and contained in the viewing record.

The rapid development and deployment of a wide variety of audio/video content delivery and distribution platforms has dramatically complicated the home unit task of providing viewing records or information to the central data collection facility. For instance, while the above-mentioned frequency detector device can be used to detect channel information at a site where network television broadcasts are being displayed (because, under normal operation conditions, the local oscillator frequency corresponds to a known network channel), such a device typically cannot be used with digital broadcast systems. In particular, digital broadcast systems (e.g., satellite-based digital television systems, digital cable systems, etc.) typically include a digital receiver or set-top box at each subscriber site. The digital receiver or set-top box demodulates a multi-program data stream, parses the multi-program data stream into individual audio and/or video data packets, and selectively processes those data packets to generate an audio/video signal for a desired program. The audio and/or video output signals generated by the set-top box can be directly coupled to an audio/video input of an output device (e.g., a television, a video monitor, etc.) As a result, the local oscillator frequency of the output device tuner, if any, does not necessarily have any meaningful relationship to the channel or program currently being displayed. For example, the local oscillator frequency may identify a tuned major channel, but it will not identify which of a plurality of minor channels within the tuned channel is actually being displayed.

To allow generation of meaningful viewing records in cases wherein, for example, the network channel is not readily identifiable or may not uniquely correspond to a displayed program, metering techniques based on the use of ancillary codes and/or content signatures may be employed. Metering techniques that rely on ancillary codes often encode and embed identifying information (e.g., a broadcast/network channel number, a program identification code, a broadcast time stamp, a source identifier to identify a network and/or station providing and/or broadcasting the content, etc.) in the broadcast signal such that the code is not noticed by the viewer. For example, a well-known technique used in television broadcasting involves embedding the ancillary codes in the non-viewable vertical blanking interval or the horizontal blanking region of the video signal. Another example involves embedding the ancillary codes in non-audible portions of the audio signal accompanying the broadcast program. This latter technique is especially advantageous because the ancillary code may be reproduced by, for example, the television speaker and non-intrusively monitored by an external sensor, such as a microphone.

In general, signature-based program identification techniques use one or more characteristics of the currently displayed (but not yet identified) audio/video content to generate a substantially unique proxy or signature (e.g., a digital value or series of digital values, a waveform, etc.) for that content. The signature information for the content being displayed may be compared to a set of reference signatures corresponding to a known set of programs. When a substantial match is found, the currently displayed program content can be identified with a relatively high probability.

Many household viewing sites (e.g., home entertainment systems) include a video game console for playing video games for display on a television or similar display device. The video gaming market is highly competitive and video game technology has evolved to the point that the displayed content may contain commercial advertisement (e.g., embedded within portions of the game background), embedded movie clips that contain strategic product placement, soundtracks from professional recording artists, etc. Thus, it has become desirable to collect viewing/metering information associated with the playing of video games separately and/or in addition to the viewing records generated for the broadcast programming content displayed at the household viewing site. However, the types of viewing/metering data collected for monitoring video game usage may be significantly different than the types of viewing/metering data collected for monitoring of audience viewing of broadcast programs. As such, the existing techniques for monitoring broadcast programming content may not be directly applicable to the collection of game play/viewing/metering information for audience participation in video games.

DETAILED DESCRIPTION

In the following patent, a video game console is defined to be any device capable of playing a video game. Such a device may include a standard dedicated game console, a portable dedicated gaming device, a personal digital assistant (PDA), a personal computer, a digital video disk (DVD) player, a digital video recorder (DVR), a personal video recorder (PVR), a set-top box, a cable or satellite receiver, a cellular/mobile phone, and the like. Similarly, as used in this patent, a video game medium is defined to be any medium capable of storing and/or providing video game content, which may include game disks, game cartridges, DVDs, CD-ROMs, memory cards, an Internet gaming server, a peer-to-peer or closed gaming network such as Nokia N-Cage, and the like. Also, as used in this patent, a video game is defined to be any game designed to be played via a video game console (as defined above) and displayed on a monitor, such as a television screen, a dedicated game display (e.g., an arcade console, a handheld gaming device such as Nintendo's GameBoy SP) or on a personal computer (PC) monitor. Thus, a video game may be an arcade game, a PC-based game, a game for use with a home-based game system (e.g., a game coded for playing on Microsoft's XBOX, Nintendo's GameCube, Sony's PlayStation, etc.) or a game for use with a portable gaming system game (e.g., a game coded for playing on Nintendo's GameBoy handheld gaming device, etc.).

Figure 1:
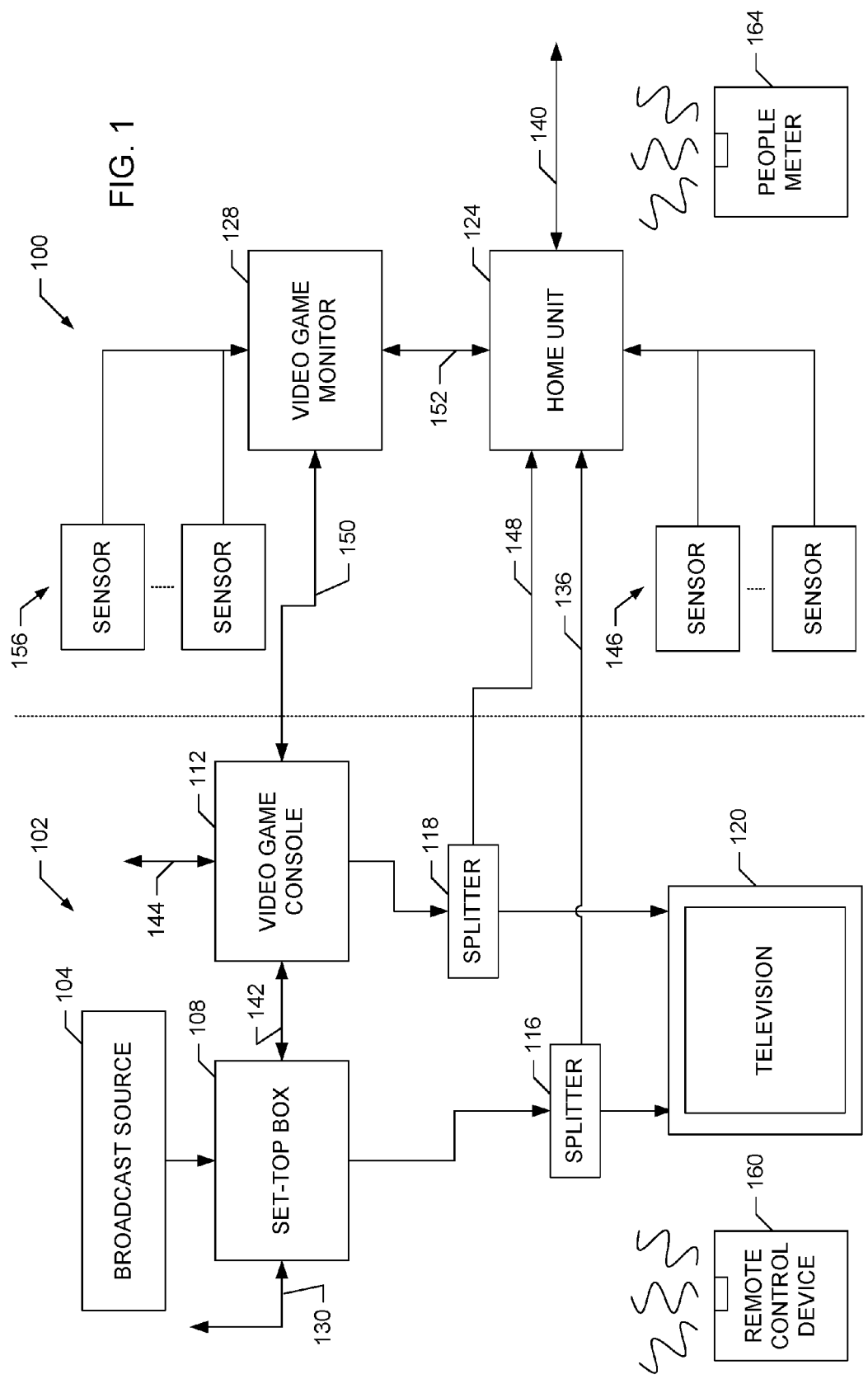
FIG. 1 is a block diagram of an example local metering system coupled to an example home entertainment system.

A block diagram of an example local metering system 100 capable of providing viewing and metering information for video games played via an example home entertainment system 102 is illustrated in FIG. 1. The example home entertainment system 102 includes a broadcast source 104, a set-top box (STB) 108, a video game console 112, signal splitters 116, 118 and a television 120. The example local metering system 100 includes a home unit 124 and a video game monitor 128. The components of the home entertainment system 102 and the local metering system 100 may be connected in any well-known manner including that shown in FIG. 1. For example, in a statistically selected household having one or more home entertainment systems 102, the home unit 124 may be implemented as a single home unit and one or more site units. In such a configuration, the single home unit performs the functions of storing data and forwarding the stored data to a central facility (such as the central facility 211 of FIG. 2 discussed below) for subsequent processing. Each site unit is coupled to a corresponding home entertainment system 102 and performs the functions of providing one or more interfaces to facilitate the collection of viewing/metering data, processing such data (possibly in real-time) and sending the processed data to the home unit for that home. The home unit receives and stores the data collected by the site units and subsequently forwards that collected data to the central facility.

The broadcast source 104 may be any broadcast media source, such as a cable television service provider, a satellite television service provider, a radio frequency (RF) television service provider, an Internet streaming video/audio provider, etc. The broadcast source 104 may provide analog and/or digital television signals to the home entertainment system 102, for example, over a coaxial cable or via a wireless connection.

The STB 108 may be any set-top box, such as a cable television converter, a direct broadcast satellite (DBS) decoder, a video cassette recorder (VCR), etc. The STB 108 receives a plurality of broadcast channels from the broadcast source 104. Typically, the STB 108 selects one of the plurality of broadcast channels based on a user input, and outputs one or more signals received via the selected broadcast channel. In the case of an analog signal, the STB 108 tunes to a particular channel to obtain programming delivered on that channel. For a digital signal, the STB 108 decodes certain packets of data to obtain the programming delivered on a selected channel. For some home entertainment systems 102, for example, those in which the broadcast source 104 is a standard RF analog television service provider or a basic analog cable television service provider, the STB 108 may not be present and its function may instead be performed by a tuner in the television 120.

An output from the STB 108 is fed to a signal splitter 116, such as a single analog y-splitter in the case of an RF coaxial connection between the STB 108 and the television 120 or an audio/video splitter in the case of a direct audio/video connection between the STB 108 and the television 120. (For configurations in which the STB 108 is not present, the broadcast source 104 may be coupled directly to the signal splitter 116.) In the example home entertainment system 102 of FIG. 1, the signal splitter 116 produces two signals indicative of the output from the STB 108. Of course, a person of ordinary skill in the art will readily appreciate that any number of signals may be produced by the signal splitter 116.

The STB 108 may also be coupled to a back-channel connection 130 to provide a return communication path to the broadcast provider corresponding to the broadcast source 104. The STB 108 may use the back-channel connection 130 to send billing and/or status information to the broadcast provider. The back-channel connection 130 may also allow a subscriber to use the STB 108 to request/order content for viewing on the television 120 (e.g., pay-per-view movies, video-on-demand programming, etc.), purchase goods and/or services, modify the subscription package associated with the STB 108, request/order video games and/or video game components for playing via the video game console 112, etc.

In the illustrated example, one of the two signals from the signal splitter 116 is fed to the television 120 and the other signal is delivered to the home unit 124. The television 120 may be any type of television or television display device. For example, the television 120 may be a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, or may be a multimedia computer system, etc.

The second of the two signals from the signal splitter 116 (i.e., the signal carried by connection 136 in FIG. 1) is coupled to an input of the home unit 124. The home unit 124 is a data logging and processing unit that may be used to generate viewing/metering records and other viewing information useful for determining ratings and other metering information based on a group of statistically selected households. The home unit 124 typically collects a set of viewing/metering records and transmits the collected viewing records over a connection 140 to a central office or data processing facility (not shown) for further processing or analysis. The connection 140 may be a telephone line, a return cable television connection, an RF or satellite connection, an Internet connection or the like. As mentioned above, in instances where multiple viewing sites are present within a household, site units may be used as intermediaries to collect and forward data to the home unit 124.

The video game console 112 may be any type of game console as described above. The video game console may also include an STB connection 142 to couple the video game console 112 to the STB 108. The STB connection 142 may be used, for example, to download video games to the video game console 112 via the STB 108 based on a request transmitted over the back-channel connection 130. The video game console 112 may also include a connection 144 to allow the video game console 112 to interface with other devices, such a network server, another game console, etc.

The connections 142 and 144 may be implemented using any type of network connection, such as a serial port cable, a parallel port cable, a Universal Serial Bus (USB) cable, an Ethernet connection, a phone line connection, an 802.11 wireless connection, a Bluetooth wireless connection, etc.

The output from the video game console 112 is fed to a signal splitter 118, such as a single analog y-splitter in the case of a coaxial connection between the video game console 112 and the television 120 or an audio/video splitter in the case of a direct audio/video connection between the video game console 112 and the television 120. In the example home entertainment system 102, the signal splitter produces two signals indicative of the output from the video game console 112. Of course, a person of ordinary skill in the art will readily appreciate that any number of signals may be produced by the signal splitter 118. In the illustrated example, one of the two signals from the signal splitter 118 is fed to the television 120 and the other signal is delivered to the home unit 124 (i.e., the signal carried by connection 148).

The home unit 124 may be configured to determine identifying information based on the signal corresponding to the broadcast program content and/or the video game content being output by the STB 108 and/or the video game console 112. For example, the home unit 124 may be configured to decode an embedded ancillary code in the signal received via connections 136 and/or 148 that corresponds to the content currently being output by the STB 108 and/or video game console 112, respectively, for display on the television 120. Alternatively or additionally, the home unit 124 may be configured to generate a program signature based on the signal received via connections 136 and/or 148 that corresponds to the content currently being output by the STB 108 and/or the video game console 112, respectively, for display on the television 120. The home unit may then add this program identifying information to the viewing records corresponding to the currently displayed program and/or the metering record corresponding to the currently played video game.

To facilitate the determination of program identifying information (and game identifying information, if supported) and the generation of viewing records for the currently displayed broadcast program and/or metering records for the currently displayed video game content, the home unit 124 may also be provided with one or more sensors 146. For example, one of the sensors 146 may be a microphone placed in the proximity of the television 120 to receive audio signals corresponding to the content being displayed. The home unit 124 may then process the audio signals received from the microphone 146 to decode any embedded ancillary code(s) and/or generate one or more audio signatures corresponding to a broadcast program and/or a video game being displayed. Another of the sensors 146 may be an on-screen display reader (OSDR) for capturing images displayed on the television 120 and processing regions of interest in the displayed image. The regions of interest may correspond, for example, to a broadcast channel associated with the currently displayed program, a broadcast time associated with the currently displayed program, a viewing time associated with the currently displayed program, a title of a currently played game (if the home unit 124 is configured to monitor video game content), the active level for the currently played game (if the home unit 124 is configured to monitor video game content), etc. An example OSDR is disclosed by Nelson, et al. in U.S. Provisional Patent Application Ser. No. 60/523,444 which is hereby incorporated by reference. Yet another of the sensors 146 could be a frequency detector to determine, for example, the channel to which the television 120 is tuned. One having ordinary skill in the art will recognize that there are a variety of sensors 146 that may be coupled with the home unit 124 to facilitate generation of viewing records and/or metering records containing sufficient information for the central office to determine a set of desired ratings and/or metering results.

To determine information specific to the video game console 112 and the game content output thereby (in addition or as an alternative to any information generated by the home unit 124), the example local metering system 100 includes a video game monitor 128. The video game monitor 128 is coupled to the video game console 112 via a device interface 150 and is also coupled to the home unit 124 via a home unit interface 152. The device interface 150 may be, for example, a digital bus interface that allows the video game monitor 128 to determine the state of and/or examine/modify the operation of the video game console 112. Alternatively or additionally, the video game monitor 128 may receive video game metering data (or the contents thereof) over the device interface 150 that correspond to the game content currently being output by the video game console 112. The video game metering data (or the contents thereof) may contain information regarding the game content currently being output by the video game console 112, including, for example, the video game title, the active video game state (e.g., level of progress within the game, health, score, level of difficulty selected for play, etc.), the elapsed playing time, etc.

To create the video game metering data, an example video game console 112 may include a software meter. The software meter determines information regarding the video game state and the content being displayed based on the video game data being processed by the video game console 112. Alternatively or additionally, the example video game console 112 may be configured to allow the video game monitor 128 to examine the internal state/operation of the video game console 112 and/or process the actual data packets corresponding to the video game being played. Also, the software meter may be configured to implement all or portions of the video game monitor 128 and/or all or portions of the home unit 124 within the video game console 112. The video game monitor 128 may then use the resulting information to create the information packet or packets corresponding to the played video game.

The home unit interface 152 may be, for example, a bus interface that allows the video game monitor 128 to provide, for example, video game metering data (or the contents thereof) to the home unit 124 for inclusion in one or more separate metering records and/or one or more viewing records being created for the content currently being displayed on the television 120. Alternatively or additionally, the home unit 124 may use the home unit interface 152 to direct the video game monitor 128 to query the video game console 112 to provide metering data corresponding to the video game content currently being displayed on the television 120.

The video game monitor 128 may also be coupled to one or more sensors 156. For example, one of the sensors 156 may be an optical reader capable of reading an image embossed on the face of a video game disk to determine the title of the corresponding video game. Other example sensors 156 include a barcode reader and a radio frequency identification (RFID) reader capable of reading a barcode and/or an RFID tag, respectively, attached to the video game medium (e.g., disk or cartridge). One having ordinary skill in the art will recognize that there are a variety of sensors 156 that may be coupled with the video game monitor 128 to determine additional information regarding the operation of the video game console 112.

In a first example local metering system 100, the home unit 124 may be configured to generate a viewing/metering record or records based on the state of the television 120 as measured by a sensor or sensors 146. In this case, the home unit 124 may include video game metering data (or contents thereof) provided by the video game monitor 128 in the metering record or records being generated. In a second example local metering system 100, the video game monitor 128 may be configured to trigger the home unit 124 to generate a metering record or records based on the state of the video game console 112 as measured by a sensor or sensors 156. One having ordinary skill in the art will recognize that various combinations of triggers may be used to cause the generation of the metering records corresponding to the game content currently being displayed on the television 120. For example, a combination of one of the sensors 146 determining that the television 120 is turned ON and one of the sensors 156 determining that the video game console 112 is turned ON may serve as such a trigger.

The example home entertainment system 102 also includes a remote control device 160 to transmit control information that may be received by any or all of the STB 108, the video game console 112, the television 120, the home unit 124 and the video game monitor 128. One having ordinary skill in the art will recognize that the remote control device 160 may transmit this information using a variety of techniques, including, but not limited to, infrared (IR) transmission, radio frequency transmission, wired/cabled connection, and the like.

The example local metering system 100 also includes a people meter 164 to capture information about the audience. The example people meter 164 may have a set of input keys, each assigned to represent a single viewer, and may prompt the audience members to indicate that they are present in the viewing audience by pressing the appropriate input key. The people meter 164 may also receive information from the home unit 124 to determine a time at which to prompt the audience members. Moreover, the home unit 124 may receive information from the people meter 164 to modify an operation of the home unit 124 (such as causing the home unit to generate one or more viewing/metering records based on a change in the viewing audience). As will be appreciated by one having ordinary skill in the art, the people meter 164 may receive and/or transmit information using a variety of techniques, including, but not limited to, infrared (IR) transmission, radio frequency transmission, wired/cabled connection, and the like. As will also be appreciated by one having ordinary skill in the art, the people meter 164 may also be implemented by a combination of the remote control device 160 and one or more of the STB 108, the video game console 112, the video game monitor 128, and/or the home unit 124. In such an implementation, the STB 108, the video game console 112, the video game monitor 128, and/or the home unit 124 may be configured to output prompting information and/or other appropriate people meter content for display directly on the television 120. Correspondingly, the remote control device 160 and/or a game controller (such as the game controller 308 discussed in FIG. 3 below) may be configured to accept inputs from the viewing audience and transmit these user inputs to the appropriate device responsible for generating the people meter display on the television 120.

Figure 2:
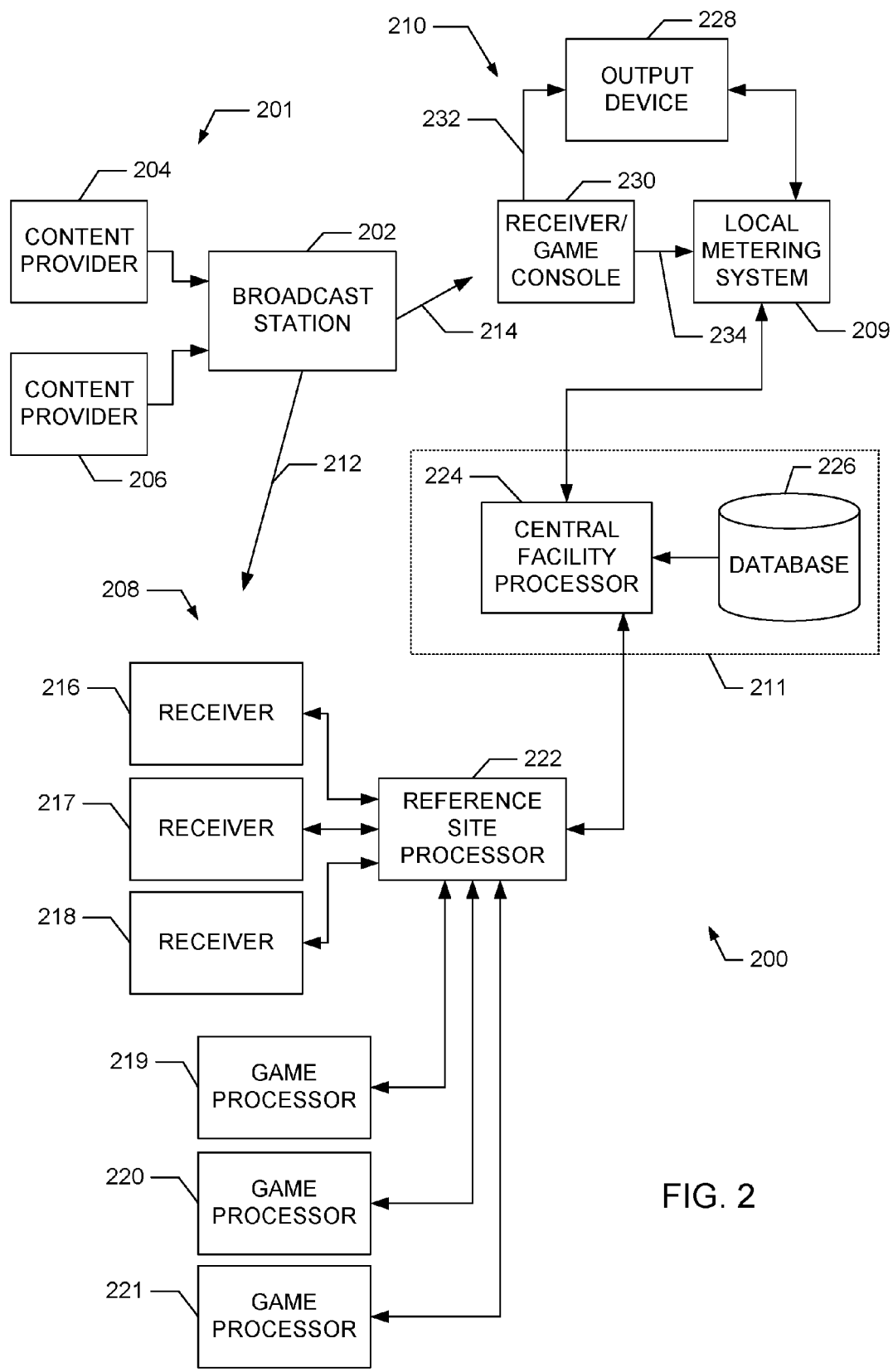
FIG. 2 is a block diagram of an example broadcast system and an example monitoring system.

FIG. 2 illustrates an example monitoring system 200 to monitor viewing of program and/or playing of game content provided by an example broadcast system 201, as well as local video gaming content being played at a local home site 210. The example broadcast system 201 of FIG. 2 includes a broadcast station 202 that receives audio/video content from a plurality of content providers 204 and 206. The audio/video content providers 204 and 206 may provide audio and/or video programs or information, such as television programs, advertisements, audio (e.g., radio) programs, still image information (e.g., web pages), etc., in known manners to the broadcast station 202.

The example monitoring system 200 of FIG. 2 includes one or more reference sites 208, a plurality of local metering systems 209 (for example, a set of systems similar or identical to the local metering system 100 of FIG. 1) located at a plurality of home sites 210 (which may be statistically selected to represent a larger population) and a central facility 211 to compile and process data collected by the local metering systems 209. For ease of reference, only one home site 210, one reference site 208 and one central facility 211 are shown in FIG. 2. However, persons of ordinary skill in the art will appreciate that any number of home sites 210, reference sites 208 and/or central data collection and processing facilities 211 may be employed.

The broadcast station 202 transmits one or more signals containing digital and/or analog audio/video content and/or game information. These signals are received by at least one reference site 208 and at least one statistically selected home site 210 via communication paths or links 212 and 214, respectively. The communication paths or links 212 and 214 may include any combination of hardwired or wireless links, such as satellite links, wireless land-based links, cable links, etc. The signals conveyed via the links 212 and 214 may contain multi-program analog signals and/or digital data streams which are commonly employed within existing broadcast systems.

In the example monitoring system 200, the reference site 208 includes a plurality of receivers (e.g., set-top boxes or the like) 216, 217 and 218 that simultaneously demodulate, demultiplex and/or decode audio, video and/or other information received from the broadcast station 202. In the illustrated example, each of the receivers 216, 217 and 218 provides audio and/or video information associated with a different program that is currently being broadcast to a reference site processor 222. In other words, the receiver 216 may provide audio and/or video information associated with a program A while the receivers 217 and 218 provide audio and/or video information associated with respective programs B and C. In addition, the reference site processor 222 is configured to control each of the receivers 216, 217 and 218 and/or has information indicating a program to which each of the receivers 216, 217 and 218 is tuned at any given time.

Some reference sites 208 may also include a plurality of game processors 219, 220, 221 that may be used to generate reference metering information corresponding to a set of video games. Such information may include ancillary audio/video codes, generated audio/video signatures, video watermarks, game disk/cartridge memory maps, game disk reference images, reference barcodes, reference RFID information, etc. One or more of the game processors 219, 220, 221 may be implemented to generate the reference information by directly processing the data stored on the game medium (e.g., disk or cartridge) rather than through actual game play. For example, in the case of a game disk (e.g., CD or DVD), a special-purpose software program may be written to process the file system of a game disk inserted into an existing or special-purpose disk drive of a computer system. In the case of a game cartridge, for example, a special-purpose software program may be written to process each memory location of a game cartridge inserted into a special-purpose reader (e.g., a PROM reader) coupled to a computer system. In either case, the special-purpose program may be configured to scan the game medium to identify game content of interest stored therein. For example, the special-purpose program may scan the file system of a game disk to identify filenames and/or file header information having a format corresponding to game content of interest. In another example, the special-purpose program may scan each memory location of a game cartridge to identify header data having a format corresponding to game content of interest. Such game content may include audio data/files (e.g., in a known format, such as PCM or MPEG), video data/files (e.g., in a known format, such as MPEG), textures, sprites, etc. Moreover, the special-purpose program may be configured to automatically identify any game content of interest found on a game medium being analyzed. Additionally or alternatively, the program may display a graphical interface corresponding to the game medium file system, memory map, etc. Such a graphical interface allows a user to quickly identify potential game content of interest more quickly and efficiently than playing the game in a standard linear fashion. One having ordinary skill in the art will appreciate that the approach used to implement the special-purpose software program described above will depend on the type of game medium being analyzed and the data format employed by the game medium manufacturer/producer.

In the illustrated example, each of the game processors 219, 220 and 221 may also be coupled to the reference site processor 222 to provide reference metering data associated with a different video game. In other words, the game processor 219 may provide metering information associated with a video game A while the game processors 220 and 221 provide metering information associated with respective video games B and C. In addition, the reference site processor 222 may be configured to control each of the game processors 219, 220 and 221 and/or has information indicating a video game that each of the game processors 219, 220 and 221 is analyzing at any given time.

The reference site processor 222 may decode reference ancillary code information and/or generate reference signature information for a plurality of simultaneously broadcast audio/video content and/or analyzed video game content. The reference site processor 222 sends the reference code and/or signature information to a central facility processor 224 which stores the original reference code and/or signature information, as well as any other collected reference metering data, in a database 226. Of course, because the generation of game data may not require receivers to tune to broadcasted programs/games, but instead such data may be gathered directly from the game media, there is no need to locate the game processors at the reference site. The game processors may instead be located at the central facility 211 or at another dedicated game processing site. Similarly, although a single database 226 that combines program codes/signatures and video game codes/signature is shown in FIG. 2, persons of ordinary skill in the art will appreciate that it is likewise possible to maintain a separate database for programming content and a separate database for video games.

The home site 210 could be, for example, a statistically selected home containing a television, a radio, etc. The home site 210 includes an output device 228 (e.g., a video display, speaker, etc., such as the television 120 of FIG. 1). The home site 210 also includes a receiver, such as the STB 108 which may be similar or identical to the receivers 216, 217, 218, and/or a game console, such as the video game console 112 of FIG. 1 which may be similar or identical to the game processors 219, 220, 221. The receiver and the video game console may be combined in a single device 230 as shown in FIG. 2, or may comprise two or more components in two or more housings. The receiver and/or video game console 230 provides audio and/or video signals 232 to the output device 228. The output device presents the program and/or video game currently selected for consumption. Receivers and/or video game consoles 230 are well-known and, thus, are not described in greater detail herein.

To monitor the use of the receiver and/or video game console 230, the home site 210 is provided with a local metering system 209, such as the local metering system 100 of FIG. 1. The local metering system 209 may include, for example, a home unit and/or a video game monitor such as the home unit 124 and the video game monitor 128. The receiver and/or video game console 230 provides an audio and/or a video signal 234 containing audio and/or video information associated with the currently displayed program to the local metering system 209. The local metering system 209 uses the signal 234 to determine viewing/metering information (e.g., by decoding ancillary code information and/or generating signature information) corresponding to the broadcast program and/or video game currently being displayed on the output device 228. The local metering system 209 stores and periodically conveys this viewing/metering information to the central facility processor 224, for example, in the form of a viewing/metering record or set of records.

The central facility processor 224, in addition to being able to perform a variety of other processing tasks, is configured to compare the viewing/metering information (e.g., possibly including code and/or signature information) generated at the home site 210 to the corresponding reference viewing/metering information stored in the database 226 to identify the broadcast program and/or video game content that was displayed at the home site 210.

Figure 3:
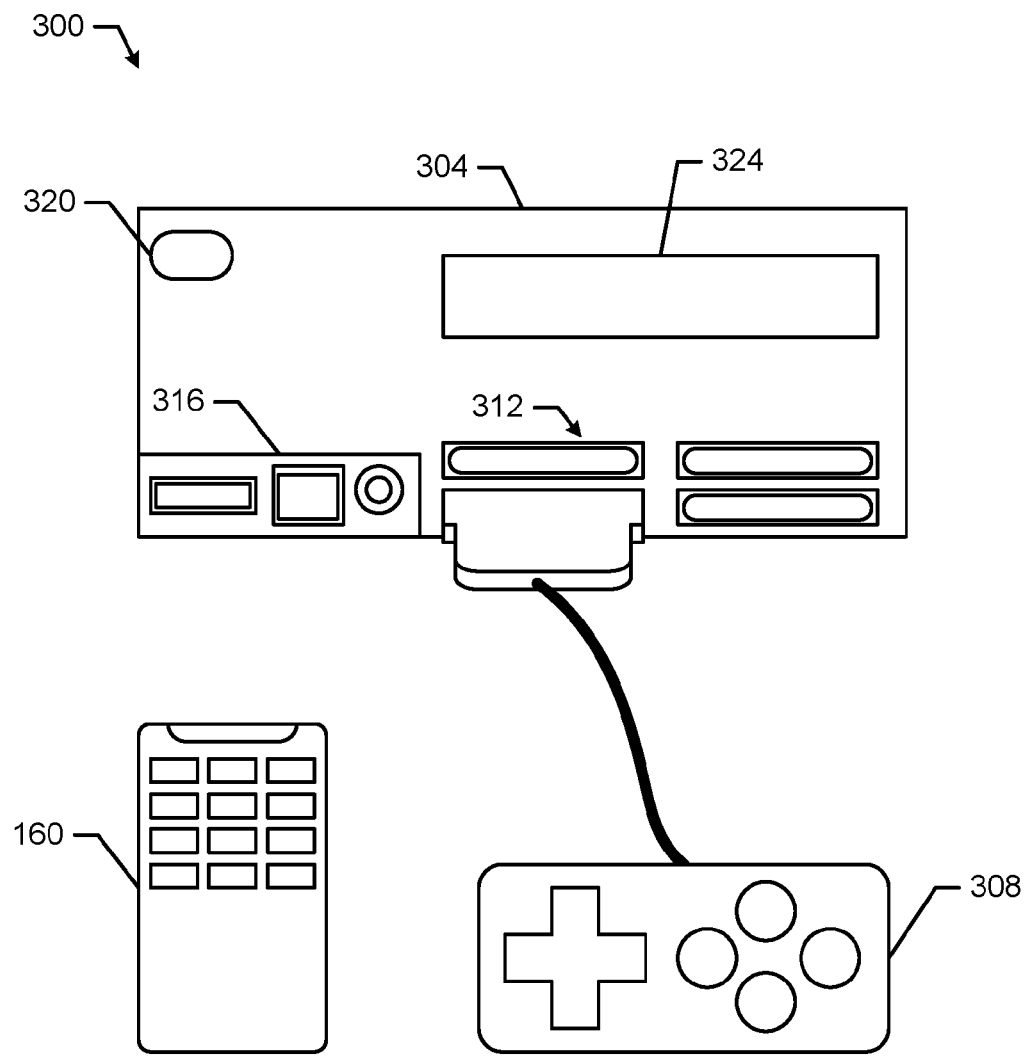
FIG. 3 is a block diagram of an example video game console for use in the example home entertainment system of FIG. 1.

A block diagram of an example video game system 300 that may be used to implement the video game console 112 of FIG. 1 is shown in FIG. 3. The example video game system 300 includes a game console 304 and a game controller 308. Also shown for reference is the remote control device 160 of FIG. 1.

The game controller 308 may be any type of appropriate input device, such as a keypad, a joystick, a mouse, a keyboard, etc. The game controller 308 may be coupled to the game console 304 via a controller port 312, such as a special purpose serial or parallel port, a wireless interface adaptor, etc. The game console 304 may also include additional interface ports 316 for connection to other external devices. Examples of additional interface ports 316 include serial ports, USB ports, Ethernet ports, etc.

The game console 304 may also include a remote control device detector 320, such as an infrared (IR) detector, to receive signals transmitted by the remote control device 160.

The game console 304 of FIG. 3 also includes one or more game ports 324 to receive one or more game disks, cartridges or the like. The game port 324 may also be used to interface to another device that may emulate the data stored on and/or the operation of the game disk, cartridge, etc.

As mentioned previously, existing broadcast program content metering techniques may not be suitable for monitoring audience participation in video games. For example, a broadcast programming guide (or equivalent mapping of displayed content to broadcast time) is generally not applicable in the case of video games. Moreover, the type of metering information desired for video game content may be significantly different from the type of metering data desired for broadcast programs. For example, and as mentioned above, the types of metering data collected for video game usage may include: A) the identity of the game being played, B) the times at which the game is actively played (instead of, for example, operating in a demo mode), C) the duration of game play, D) the game content (e.g., area, location, level, etc.) that is active (e.g., cached) at a specific point during game play, E) the game content (e.g., area, location, level, etc.) that is actually being presented to the user (e.g., displayed and/or audible) at a specific point during game play, F) the identity/identities and/or the number of players who are participating in the game locally and/or remotely, G) whether the game is being played across a communications network (e.g., the Internet, a local area network (LAN), a direct cable connection, a dial-up connection, etc.), H) any content that may have been downloaded to the game from an external source (e.g., a network server, and Internet site, a memory card, etc.), as well as any other information of interest. These classifications of video game measurements are discussed in greater detail in the following paragraphs.

An example type of video game metering data to collect is the identity of the game being played, which includes the title and possibly the manufacturer of the video game. Additionally, the game platform corresponding to the currently played game may be reported, especially in cases in which the game may be available for play on multiple different types of game consoles/platforms. For example, the identity of the game may be reported as: "Game Title" by "Game Manufacturer" for use on "Game Console/Platform."

Another example type of video game metering data to collect is a set of times during which the game is actively played. This set of times may be different than a set of times for which the game console 112 is enabled (e.g., turned ON). For example, many video games start-up in a demo mode that displays example game play content. In such a scenario, the actual playing times (e.g., game start, game end, game pause, game resume, etc.) should be identified separately from times corresponding to the display of an introductory demo, a video trailer, start/setup menus, etc. In this way, active game play modes may be distinguished from other game operating modes and metering data for either or both types of modes may be collected and reported. Additionally, the duration of actual game play may be reported or determined from the reported actual game start, end, pause and resume times.

Yet another example type of video game metering to collect is the game content (e.g., the area, location, level, etc.) that is active (e.g., cached) at a specific point during game play. This category of data describes the active content of the game, for example, the content that has been locally cached for possible or actual use. Cached game content, such as a trailer, a menu, a game level, a region, a map, a stadium, a track, an audio track, an audio sample, a video sample, a video texture, etc., may be identified as being in use by the video game console. One having ordinary skill in the art will recognize that this category of information identifies only that the content is active/cached and not necessarily being presented to the player. For example, a texture (e.g., a sign) could be cached by the game console for possible use, but the player may never actually be able to see the texture depending on, for example, the player's selected point-of-view Another example type of video game metering data to collect is the presented game content (e.g., the area, location, level, etc.) that is actually being presented (e.g., displayed and/or audible) at a specific point during game play. This category describes the content of the game that is actually being presented to the player, for example, either visually or audibly. Presented game content, such as a trailer, a menu, a game level, a region, a map, a stadium, a track, an audio track, an audio sample, a video sample, a video texture, etc., may be identified as being presented to the user either visually, audibly and/or through tactile feedback. Additionally, presented game content may include content that is not actually presented to the user but impliedly present based on the game context (e.g., a racecar in a driving game where the player selected the racecar's make and model but has chosen a forward view such that the racecar itself is not visible).

Still another example type of video game metering data to collect is the number of players who are participating in the game locally and/or remotely. This category of information may also include determining the identities of the one or more individuals participating in the game. Also, identifying the number of players participating in the game may include determining whether any remote players are participating in the game through a communications interface (e.g., a local network or Internet). Additionally, the player information may distinguish between players who are real people and players who are simulated as part of the video game itself.

Another example type of video game metering data to collect is information indicating whether the game is being played across a communications network (e.g., the Internet, a local area network (LAN), a direct cable connection, a dial-up connection, etc.). Some games may operate only in a local mode or only in a network mode. Other games, however, can be played both locally and over some sort of network. In the latter case, the type of network should be reported if network play is detected.

Yet another example type of video game metering data to collect is information indicating whether any game content may have been downloaded to the game from an external source (e.g., a network server, and Internet site, a memory card, etc.). Some games support the inclusion of additional, external content to the game, for example, at game start-up and/or during game play. This content may also be identified as having been actually presented to the user. For example, games may support the inclusion of new maps, levels, content, etc. that may be downloaded from the Internet, added from a memory card and/or another disk or cartridge, etc.

Methods and apparatus to address the collection of game play/viewing/metering data for video games are discussed below. A particular method and/or apparatus may be preferred depending on the capabilities and/or the characteristics of the equipment used to implement the video game system, the degree of access to data stored in the game disk/cartridge, the degree of access to data and/or operational information corresponding to the video game console (e.g., the video game console 112 of FIG. 1), etc. The methods and/or apparatus described below may also be grouped into categories based on the techniques used by the method/apparatus to collect the game play/viewing/metering data. These categories include: 1) techniques based on ancillary codes, content (e.g., audio and/or video) signatures, video watermarks and/or content (e.g., audio and/or video) trends, 2) techniques based on monitoring the internal data and/or operation of the video game console, 3) techniques based on monitoring the game medium (e.g., disk or cartridge), 4) techniques based on network monitoring and 5) diary-based techniques.

The methods and apparatus based on ancillary codes, content signatures, watermarks and/or content trends may employ techniques based on embedded audio/video codes in the video game content, audio/video signatures derived from the presented video game content, video watermarks embedded in the video game content and/or long-term audio/video trends derived from the video game content. For example, and referring to the previous list of types of video game metering data, content (e.g., audio and/or video) signatures and/or content (e.g., audio and/or video) trends may be derived from the presented video game content and compared to a reference database of signatures/trends to determine metering information, such as, A) the identity of the game being played, D) the cached game content that is active at a specific point during game play, and E) the presented game content that is actually being presented (displayed and/or audible) at a specific point during game play. Audio codes may also provide such information and additionally may provide F) the identity/identities and/or the number of players who are participating in the game locally and/or remotely and H) information to describe audio content (e.g., audio soundtracks, audio special effects, etc.) that may have been downloaded to the game from an external source. Video codes/watermarks may be able to provide information similar to that available from the audio/video signatures and audio codes, as well as additional information, such as, B) the times at which the game is actively played, C) the duration of game play, G) whether the game is being played across a communications network and H) information to describe the game content (e.g., maps, textures, audio special effects, audio soundtracks, etc.) that may have been downloaded to the game from an external source.

The methods and apparatus based on monitoring the internal data and/or operation of the video game console may employ techniques based on collecting metering data from a memory/bus sniffing device and/or a software meter running on the video game console, collecting information obtained by mapping memory accesses to/from a game medium (e.g., disk or cartridge), monitoring one or more game controllers, etc. As described in greater detail below, and referring to the previous list of types of video game metering data, techniques based on game medium access mapping may be able to determine, for example, A) the identity of the game being played and D) the cached game content that is active at a specific point during game play. Techniques based on memory/bus sniffing may be able to provide similar information, as well as B) the times at which the game is actively played, C) the duration of game play and F) the identity/identities and/or the number of players who are participating in the game locally. Techniques based on game controller monitoring may also be able to determine information regarding B) the times at which the game is actively played, C) the duration of game play and F) the identity/identities and/or the number of players who are participating in the game locally. Finally, techniques based on software metering of the video game console may be able to provide all categories of information A) through H) described above.

The methods and apparatus based on monitoring the game medium (e.g., disk or cartridge) may employ techniques based on game medium visual image scanning, barcode marking of the game medium, RFID tagging of the game medium, etc. Referring to the previous list of types of video game metering data, techniques based on barcode marking and/or RFID tagging may be used to determine information regarding, for example, A) the identity of the game being played. Techniques based on game medium (e.g., disk) visual image scanning may also be able to identify A) the identity of the game being played, as well as, D) the cached game content that is active at a specific point during game play.

The methods and apparatus based on network monitoring may employ techniques based on network communication monitoring (sniffing) and/or server-side monitoring. Referring to the previous list of types of video game metering data, such techniques may able to provide information regarding, for example, A) the identity of the game being played, B) the times at which the game is actively played, C) the duration of game play, D) the cached game content that is active at a specific point during game play, F) the identity/identities and/or the number players who are participating in the game locally and/or remotely, G) whether the game is being played across a communications network (e.g., the Internet, a local area network (LAN), a direct cable connection, a dial-up connection, etc.) and H) any content that may have been downloaded to the game from an external source.

Finally, methods/apparatus based on the use of a diary may employ techniques based on logging information into a written diary and/or an electronic diary. Such techniques may be able to provide all categories of information A) through H) described above. However, one having ordinary skill in the art will appreciate that diary-based techniques may be prone to collecting and/or reporting inaccurate and/or erroneous information.

Figure 4:
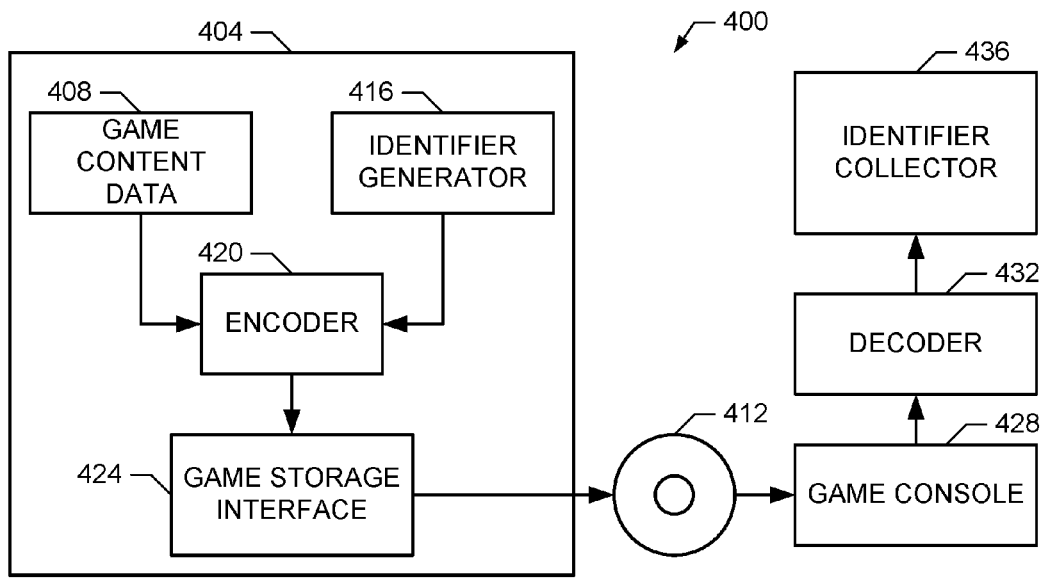
FIG. 4 is a block diagram of a first example video game monitoring system based on embedded ancillary codes.
Figure 5:
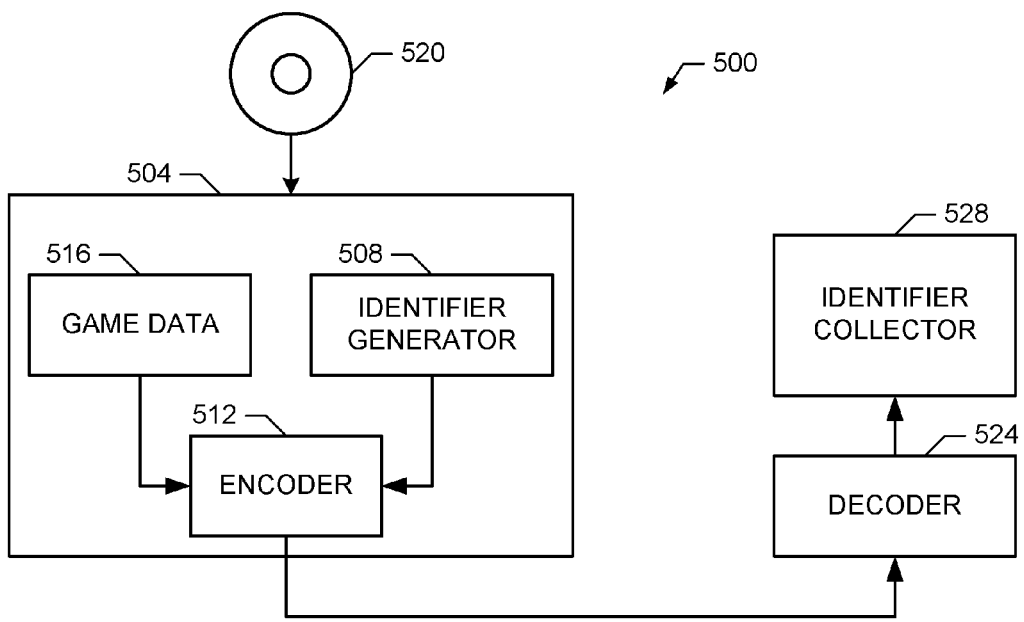
FIG. 5 is a block diagram of a second example video game monitoring system based on embedded ancillary codes.

FIGS. 4 and 5 are block diagrams illustrating example video game monitoring systems 400 and 500 which use audio/video codes to monitor game usage. In the example system 400 of FIG. 4, the audio/video codes are added to the game content by the game producer when the content is produced. In the example system of 500 of FIG. 5, the audio/video codes are embedded in the game content at run-time. For example, the audio codes may be embedded at inaudible frequencies of the audio content. Video codes may be embedded in a non-viewable vertical blanking interval (VBI) or horizontal overscan of the game console's output video signal. Example audio and video coding techniques that could be adapted for use in the example systems herein are described in, for example, U.S. Pat. No. 5,481,294, entitled "Audience Measurement System Utilizing Ancillary Codes and Passive Signatures" and filed on Oct. 27, 1993. Example techniques that could be adapted to embed audio codes such that the codes are inaudible are described in, for example, U.S. Pat. No. 6,272,176, entitled "Broadcast Encoding System and Method" and filed on Jul. 16, 1998, and PCT Application Serial No. PCT/US01/10790, entitled "Multi-Band Spectral Audio Encoding" and filed on Apr. 3, 2001. Example techniques for embedding video codes that could be adapted for use in the example systems herein are described in, for example, U.S. Pat. No. 5,629,739, entitled "Apparatus and Method for Injecting an Ancillary Signal into a Low Energy Density Portion of a Color Television Frequency Spectrum" and filed on Mar. 6, 1995, and U.S. Pat. No. 5,737,025, entitled "Co-Channel Transmission of Program Signals and Ancillary Signals" and filed on Feb. 28, 1995. U.S. Pat. Nos. 5,481,294, 6,272,176, 5,629,739, 5,737,025 and PCT Application Serial No. PCT/US01/10790 are hereby incorporated by reference in their entirety.

The audio/video codes may contain information to identify the game content that is actively being played. Background music tracks, special sounds and/or the real time audio coming from an opponent in a multi-player game could be encoded with identifiers. Due to the overlaid nature of the presented game audio and video, codes from various audio and/or video sources may be superimposed. Thus, encoding methods, such as orthogonal codes, diversity codes, etc., may be used to allow uncorrupted decoding of each superimposed code. The identifiers used to represent the game content may include identifiers for the game title, the current level of play, specific presented content, a time offset from a clock, an offset in the memory map of the game medium (e.g., disk or cartridge), etc. Codes could also be generated by the game console as directed by the game content when a significant event occurs, such as game start-up, a level/scene change, playback of a particular track of background music, etc. The source of the audio/video could be included in the embedded audio/video codes to determine whether the presented content resides on the local game medium or was provided by an external source, such as a game server.

Turning to FIG. 4, the example system 400 illustrated therein includes a content preparation device 404 to embed ancillary codes with a set of game content data 408 stored on a game medium 412. The content preparation device 404 may be located, for example, at a game provider/manufacturing site. As discussed above, the ancillary codes may be embedded, for example, in the audio and/or video portions of the presented game content. Additionally or alternatively, the ancillary codes may be embedded in the digital streams (e.g., MPEG or AC3 data streams) used to carry the audio and/or video content. To embed the ancillary codes, the content preparation device 404 includes an identifier generator 416 to provide the identification information to be associated with the given game content data 408 being encoded. For example, the identifier generator 416 may be coupled with a database (not shown) from which identifiers are selected corresponding to the type of game content 408 being encoded. Next, an encoder 420 is included to encode the game content data 408 with the information provided by the identifier generator 416. For example, in the case of audio coding of audio content, the encoder 420 may be configured to embed the information from the identifier generator 416 at non-audible frequencies of the game content data 408. In the case of video coding of video content, the encoder 420 may be configured to embed the information from the identifier generator 416 into non-viewable portions of the game content data 408 (e.g., in the vertical blanking interval, horizontal overscan, etc.). The output of the encoder 420 is then provided to a game storage interface 424 to store the prepared, encoded game content onto the game medium 412.

At a user site, the example system 400 includes a game console 428, such as the game console 112 of FIG. 1, to play the game medium 412. The game console 428 is coupled to a decoder 432 to decode the ancillary code information embedded in the prepared game content stored on the game medium 412 and presented by the game console 428. The decoder 432 may be included, for example, in a game monitor, such as the video game monitor 128 of FIG. 1, which may be coupled to the game console 428 via a device interface, such as the device interface 150. Alternatively, the decoder 432 may be a separate device coupled to the game console 428 via an external interface port of the game console 428, such as the external interface ports 316 of the example game console 304 of FIG. 3. In either case, the example system 400 of FIG. 4 includes an identifier collector 436 to receive the decoded information from the decoder 432. The identifier collector 436 may be configured to provide the decoded information to a central facility for processing and crediting, such as the central facility 211 of FIG. 2.

Turning to FIG. 5, the example system 500 illustrated therein is similar to the example system 400 of FIG. 4. The example system 500 includes content preparation functionality similar to that of system 400, but with such functionality embedded in a game console 504 rather than implemented as a separate, production site device. In the system 500, an identifier generator 508 is included in the game console 504 to provide information to be embedded by an encoder 512 as ancillary codes into the game content data 516 provided by the game medium 520 being played by the game console 504. The encoder 512 embeds such ancillary codes directly into the content (e.g., audio and/or video) output by the game console 504. Additionally or alternatively, the ancillary codes may be embedded directly into the digital streams (e.g., MPEG or AC3 data streams) used to carry the audio and/or video content. The identifier generator 508 is not associated with a particular game medium (as may be the case for the identifier generator 416 of FIG. 4) and, as such, the type of identifying information generated by the identifier generator 508 may be generic in nature and applicable to a wide variety of video games. For example, and as described previously, the encoder 512 may embed codes containing, for example, identifying information based on predetermined types of game content 516 that cause certain events in the game console 504 to occur, such as content that causes game start-up, a level/scene change, playback of a particular track of background music, etc. Moreover, the game console 504 may be configured to output a code look-up table, for example, at start-up to assist the decoder 524 described below to determine the game content 516 and/or internal events of the game console 504 that correspond to an embedded code. As much of the functionality of the identifier generator 508 and the encoder 512 is similar to that of the identifier generator 416 and encoder 420, a more detailed description of this functionality may be found in the preceding description of FIG. 4.

The example system 500 also includes a decoder 524, which may be substantially similar or identical to the decoder 432 of FIG. 4, to decode the ancillary code information embedded by the encoder 512 into the game content data 516. The decoder 524 may be included, for example, in a game monitor, such as the game monitor 128 of FIG. 1, which may be coupled to the game console 504 via a device interface, such as the device interface 150. Alternatively, the decoder 524 may instead be a separate device coupled to the game console 504 via an external interface port of the game console 504, such as the external interface ports 316 of the example game console 304 of FIG. 3. In either case, the example system 500 includes an identifier collector 528, which is similar to the identifier collector 436 of FIG. 4, to receive the decoded information from the decoder 524. The identifier collector 528 may be configured to provide the decoded information to a central facility for processing and crediting, such as the central facility 211 of FIG. 2.

Figure 6:
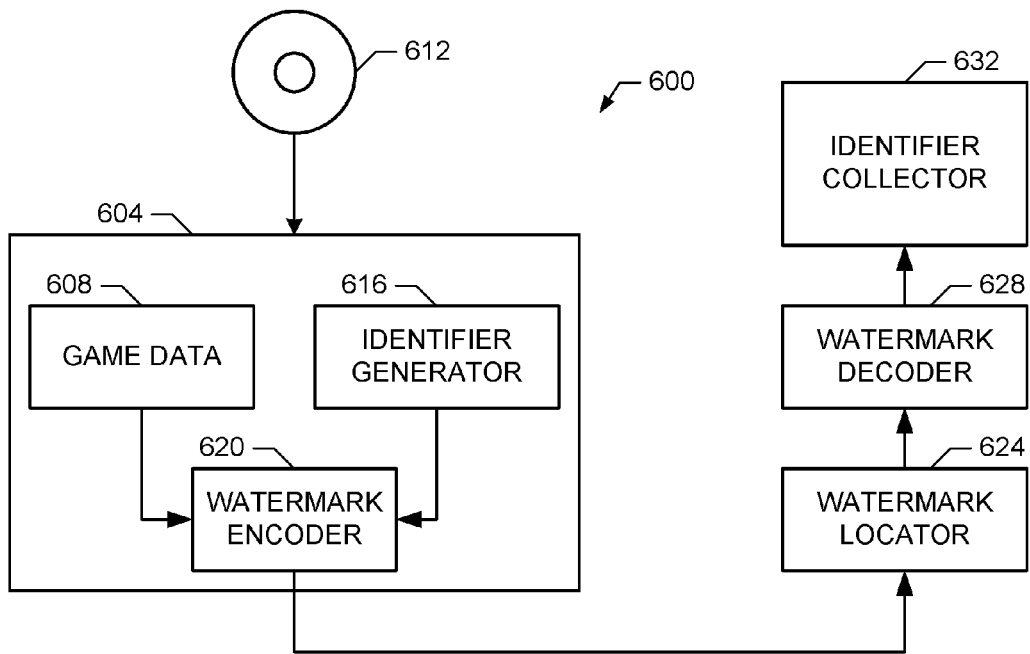
FIG. 6 is a block diagram of an example video game monitoring system based on video watermarks.

FIG. 6 illustrates a block diagram of an example video game monitoring system 600 based on the use of video watermarks. In the illustrated example system 600, the video game console 604 watermarks the active output video signal to embed codes and/or information concerning the game identity and possibly the game content currently being presented to the user. This approach is different from approaches that use video coding techniques in that the watermarks are embedded into the active (viewable) portions of the video (rather than non-viewable portions of the video). However, the watermarks are constructed and embedded so that they are not easily viewable to the user and/or are not located in a pre-determined fixed location of the displayed video output. As such, embedded video watermarks may be detected by an external sensor, such as an OSDR being used as one of the sensors 146 of FIG. 1. Because most games perform significant transforms on the video content and game textures, the watermarking will typically be performed on the final video frame buffer to be displayed to the user. Example watermarking techniques that could be adapted for use in the example systems herein are described in, for example, U.S. Pat. No. 6,208,735, entitled "Secure Spread Spectrum Watermarking for Multimedia Data" and filed on Jan. 28, 1999, and U.S. Pat. No. 6,353,672, entitled "Steganography Using Dynamic Codes" and filed on Mar. 8, 2000. U.S. Pat. Nos. 6,208,735 and 6,353,672 are hereby incorporated by reference in their entirety.

Turning to FIG. 6, the example system 600 illustrated therein includes a game console 604 to play game content data 608 stored on a game medium 612. The game console includes an identifier generator 616, which is similar to the identifier generators 416 and 508 of FIGS. 4 and 5, respectively. The identifier generator 616 provides the identification information to be associated with the given game content data 608. Such identification information is embedded into the presented game content via a watermark encoder 620. As mentioned above, the watermark encoder 620 may use any well-known technique to embed the identification information as one or more watermarks into the active video output of the game console 604.

The example system 600 also includes a watermark locator 624 to locate positions in the video output of the game console 604 that may contain one or more watermarks embedded by the watermark encoder 620. For example, the watermark locater 624 may be configured to process a small portion of the video display output that may be used to display embedded watermarks at a rate not noticeable to the human eye. In another example, the watermark locator 624 may be configured to process sudden background color changes that occur in adjacent, interlaced video frames and, as such, are not noticeable to the human eye but may be used to encode identification information. In any case, the output of the watermark locator 624 is provided to a watermark decoder 628 to decode the ancillary codes embedded by the watermark encoder 620. The watermark decoder 628 may be included, for example, in a game monitor, such as the game monitor 128 of FIG. 1, which may be coupled to the game console 604 via a device interface, such as the device interface 150. Alternatively, the watermark decoder 628 may instead be a separate device coupled to the game console 604 via an external interface port of the game console 604, such as the external interface ports 316 of the example game console 304 of FIG. 3. In either case, the example system 600 includes an identifier collector 632, which is similar to the identifier collectors 436 and 528 of FIGS. 4 and 5, respectively, to receive the decoded information from the watermark decoder 628. The identifier collector 632 may be configured to provide the decoded information to a central facility for processing and crediting, such as the central facility 211 of FIG. 2.

Figure 7:
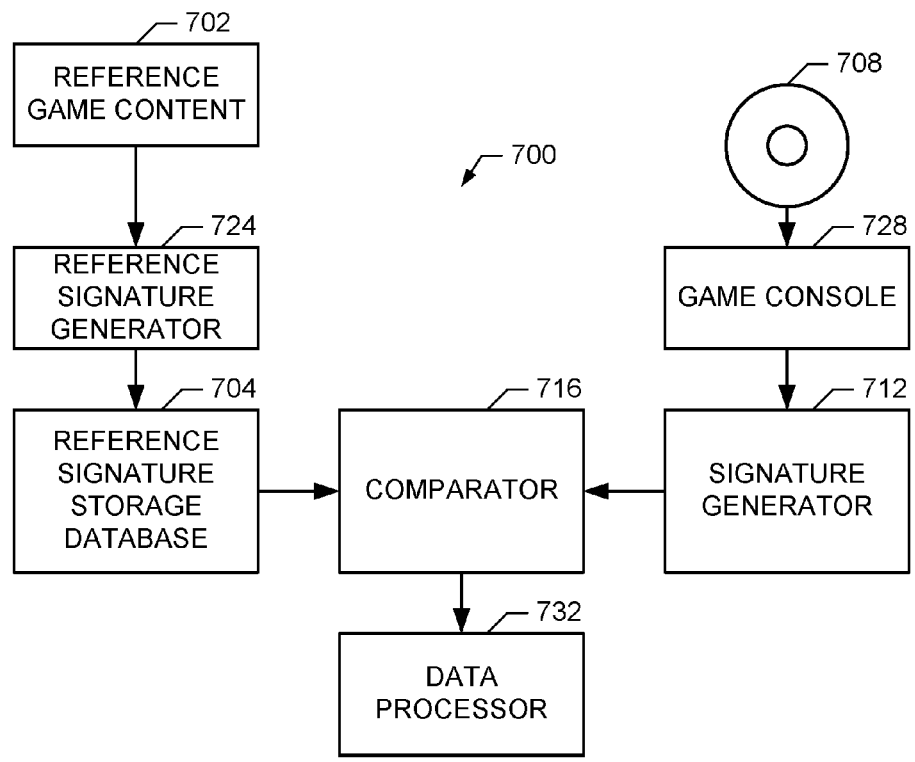
FIG. 7 is a block diagram of an example video game monitoring system based on content signatures.

FIG. 7 illustrates a block diagram of an example video game monitoring system 700 based on the use of content (e.g., audio and/or video) signatures. As discussed above in connection with FIG. 2, reference content signatures corresponding to a set of games 702 could be generated and stored in a reference library/database 704. Then, when a particular game medium 708 is played, signatures corresponding to the presented content may be generated via a signature generator 712. The content signatures (e.g., audio and/or video signatures) may then be cross-referenced via a comparator 716 against the reference library database 704 to determine, for example, the identity of the game being played. Moreover, the content signatures may be matched, for example, to game content presented at a particular point in the game. For some game media types, it may be possible to generate the reference content signatures by processing the content of the game medium (e.g., disk/cartridge) directly by, for example, a special-purpose software program and not through playing the game in a linear fashion. For game devices with digital outputs, signatures may be created from an output digital audio/video stream (e.g., the CRC fields in an AC3 audio data stream). U.S. Pat. No. 5,481,294, discussed above and incorporated herein, describes example audio and video signaturing techniques that could be adapted for use in the example systems herein. Additional example audio signaturing techniques that could be adapted for use in the example systems herein are described in, for example, U.S. Pat. No. 5,918,223, entitled "Method and Article of Manufacture for Content-Based Analysis, Storage, Retrieval, and Segmentation of Audio Information" and filed on Jul. 21, 1997, and U.S. application Ser. No. 10/200,034, entitled "Automatic Identification of Sound Recordings" and filed on Jul. 22, 2002. Additional example video signaturing techniques that could be adapted for use in the example systems herein are described in, for example, U.S. Pat. No. 6,633,651, entitled "Method and Apparatus for Recognizing Video Sequences" and filed on Nov. 1, 1999, and U.S. Pat. No. 6,577,346, entitled "Recognizing a Pattern in a Video Segment to Identify the Video Segment" and filed on Jan. 24, 2000. U.S. Pat. Nos. 5,481,294, 5,918,223, 6,633,651, 6,577,346 and U.S. application Ser. No. 10/200,034 are hereby incorporated by reference in their entirety.

Turning to FIG. 7, at one or more reference sites, such as the reference sites 208 of FIG. 2, the example system 700 illustrated therein includes a reference signature storage database 704, as discussed above, to store a set or reference content signatures (e.g., audio and/or video signatures) corresponding to a set of reference games 702. The reference games 702 may be processed by one or more reference signature generators 724, which may be substantially similar or identical to the game processors 219, 220, 221 of FIG. 2, to generate the set of reference content signatures. As mentioned above, the reference signature generator 724 may be implemented to process the content of the game medium (e.g., disk/cartridge) directly by, for example, a special-purpose software program and not through playing the game.

At a user site, the example system 700 includes a game console 728, which may be similar to the game console 112 of FIG. 1, to play the game stored on the game medium 708. The signature generator 712 is provided to generate content signatures (e.g., audio and/or video signatures) corresponding to the presented game content (e.g., audio and/or video) output from the game console 728. The signature generator 712 may be included in or implemented by, for example, the home unit 124 of FIG. 1. Moreover, the signature generator 712 may receive the presented content from the game console 728 using one or more sensors (e.g., the sensors 146), such as an audio microphone, a video framegrabber, an OSDR, etc.

At, for example, a central facility site such as the central facility 211 of FIG. 2, the example system 700 includes a comparator 716 to cross-reference the content signatures generated by the signature generator 712 with the set of reference signatures stored in the reference signature storage database 704. If a match is found, a data processor 732 is used to meter/credit the played game based on the reference signature(s) that matched the signature(s) generated by the signature generator 712.

Figure 8:
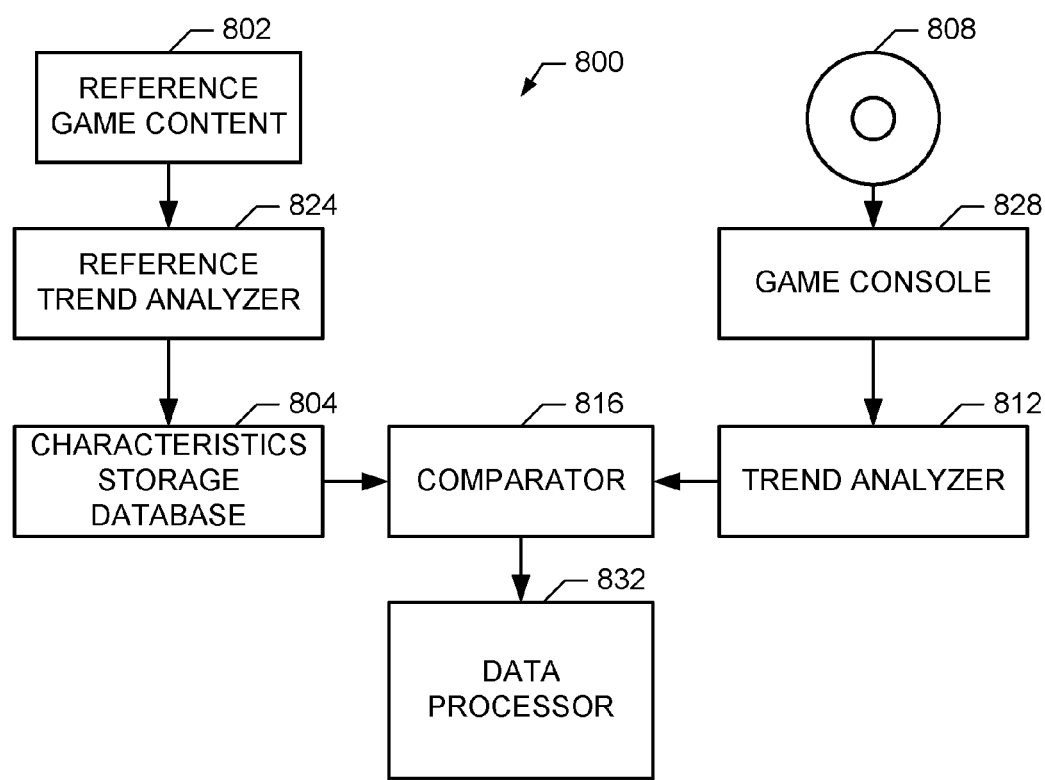
FIG. 8 is a block diagram of an example video game monitoring system based on long-term content trends.

FIG. 8 illustrates a block diagram of an example video game monitoring system 800 that uses long-term content (e.g., audio and/or video) trends to monitor video game usage. In many cases, content trends may be distinguished from content signatures in that content trends are based on broad content (e.g., audio and/or video signal) characteristics processed over a period of time significantly longer than that typically used to generate content signatures. However, in some cases, content trends may be substantially similar to content signatures. In either case, reference content trends corresponding to a set of games 802 could be generated and stored in a reference library/database 804. Then, when a particular game 808 is played, content trends that correspond to the presented content may be determined by a trend analyzer 812. The content (e.g., audio and/or video) trends may then be cross-referenced via a comparator 816 against the reference library database 804 to determine, for example, the identity of the game being played. Moreover, the content trends may be matched, for example, to game content presented at a particular point in the game. For some game media types, it may be possible to generate the reference audio/video trends by processing the content of the game medium (e.g., disk/cartridge) directly by, for example, a special-purpose software program and not through playing the game In the example of FIG. 8, the example system 800 includes a reference trend storage database 804 at one or more reference sites, such as the reference sites 208 of FIG. 2, to store a set or reference content trends (e.g., audio and/or video trends) corresponding to a set of reference games 802 as discussed above. The reference games 802 may be processed by one or more reference trend analyzers 824, which may be substantially similar or identical to the game processors 219, 220, 221 of FIG. 2, to generate the set of reference content trends. As mentioned above, the reference trend analyzer 824 may be implemented to process the content of the game medium (e.g., disk/cartridge) directly by, for example, a special-purpose software program and not through playing the game.

At a user site, the example system 800 includes a game console 828, which may be similar to the game console 112 of FIG. 1, to play the game stored on the game medium 808. The trend analyzer 812 is provided to generate content trends (e.g., audio and/or video trends) corresponding to the presented game content (e.g., audio and/or video) output from the game console 828. The trend analyzer 812 may be included in or implemented by, for example, the home unit 124 of FIG. 1. Moreover, the trend analyzer 812 may receive the presented content from the game console 828 using one or more sensors (e.g., the sensors 146), such as an audio microphone, a video framegrabber, an OSDR, etc.

At a central facility site, such as the central facility 211 of FIG. 2, the example system 800 includes a comparator 816 to cross-reference the content trends generated by the trend analyzer 812 with the set of reference trends stored in the reference trend storage database 804. If a match is found, a data processor 832 is used to meter/credit the played game based on the reference trend(s) that matched the trend(s) generated by the trend analyzer 812.

Figure 9:
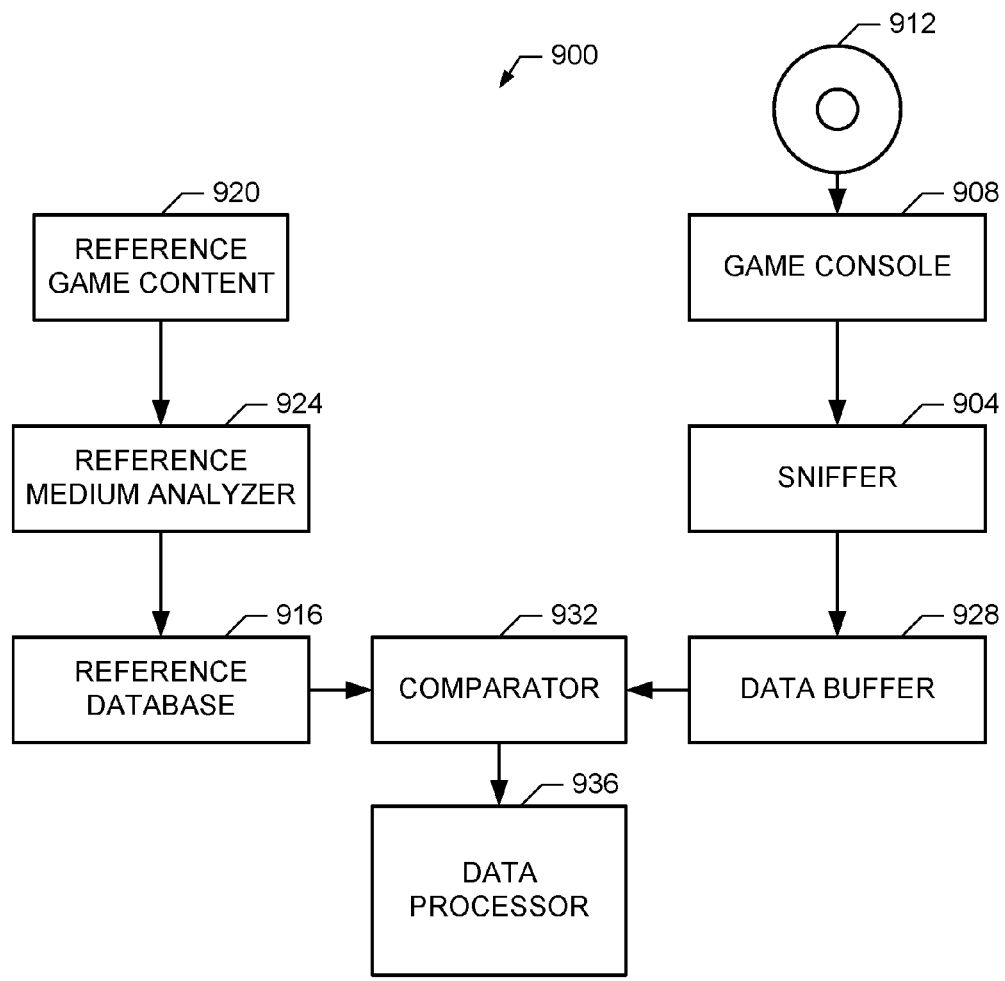
FIG. 9 is a block diagram of an example video game monitoring system based on a memory/bus analyzer.

FIG. 9 illustrates a block diagram of an example video game monitoring system 900 which employs a memory/bus analyzer 904 (also known as a memory/bus "sniffer") to monitor game usage. A memory/bus analyzer 904 may be used to monitor/probe the memory and/or the internal state of the video game console 908 to determine, for example, the identity of the game medium 912 being played, the current location within the game, the game content being displayed, etc. Depending on the game console hardware, such game content information may be probed from existing ports on the game console 908 (e.g., the interface ports 316 of FIG. 3), for example, an external memory port, a USB port and/or an expansion port. For game consoles 908 in which no existing port suffices, an interface tap may be placed on one or more of the internal busses of the game console 908. A reference library/database 916 corresponding to various video games of interest 920 may include the memory locations on the various game media that correspond to metering information to be collected and reported (e.g., game titles, game levels, soundtracks, etc.). Examples of memory/bus sniffers that could be adapted for use in the example systems herein are described in, for example, U.S. Pat. No. 5,488,408, entitled "Serial Data Channel Metering Attachment for Metering Channels to Which a Receiver is Tuned" and filed on Mar. 22, 1994, and PCT Application Serial No. PCT/US2002/038012, entitled "Apparatus and Methods for Tracking and Analyzing Digital Recording Device Event Sequences" and filed on Nov. 27, 2002. U.S. Pat. No. 5,488,408 and PCT Application Serial No. PCT/US2002/038012 are hereby incorporated by reference in their entirety.

In the example of FIG. 9, the example system 900 includes a reference database 916 at one or more reference sites such as the reference sites 208 of FIG. 2, to store a set or reference game medium information (e.g., memory maps, bus transactions, etc.) corresponding to a set of reference games 920 as discussed above. The reference games 920 may be processed by one or more reference medium analyzers 924, which may be substantially similar or identical to the game processors 219, 220, 221 of FIG. 2, to generate the set of reference game medium information. As mentioned above, the reference medium analyzer 924 may be implemented to process the content of the game medium (e.g., disk/cartridge) directly by, for example, a special-purpose software program and not through playing the game.

At a user site, the example system 900 includes a game console 908, which may be similar to the game console 112 of FIG. 1, to play the game stored on the game medium 912. The memory/bus analyzer 904 is provided to generate game medium information (e.g., memory read/write locations, captured bus transactions, etc.) corresponding to the game medium 912 as it is played on the game console 908. The memory/bus analyzer 904 may be included in or implemented by, for example, the game monitor 128 of FIG. 1 and coupled to the game console 908 via a device interface (e.g., the device interface 150) and/or an external interface port of the game console 908 (e.g., the interface ports 316 of FIG. 3). The memory/bus analyzer 904 may instead be a separate device coupled to the game console 908 via an external interface port of the game console 908, such as the external interface ports 316 of the example game console 304. One having ordinary skill in the art will appreciate that many substantially equivalent implementations may be used to provide memory/bus analyzer functionality in the example system 900. The output of the memory/bus analyzer 904 is stored in a data buffer 928, which may be implemented as a standalone device and/or by any or all of the game monitor 128 and the home unit 124.

At, for example, a central facility site such as the central facility 211 of FIG. 2, the example system 900 includes a comparator 932 to cross-reference the game medium information generated by the memory/bus analyzer 904 with the set of reference game medium information stored in the reference database 916. One having ordinary skill in the art will appreciate that the cross-referencing process may be simplified if such processing focuses on determining the game identity first (e.g., based on a sequence of memory accesses performed at game startup) and then analyzes the remaining game medium information. In any case, if a match is found, a data processor 936 is used to meter/credit the played game based on the reference information that matched the information generated by the memory/bus analyzer 904.

Figure 10:
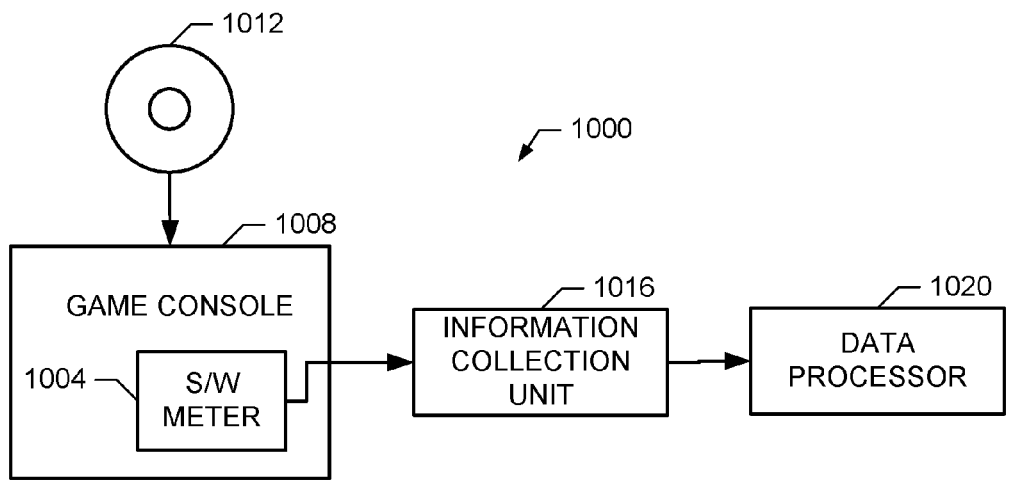
FIG. 10 is a block diagram of an example video game monitoring system based on a game console software meter.

FIG. 10 illustrates a block diagram of an example video game monitoring system 1000 which employs a game console software meter 1004 to perform video game monitoring. In the illustrated example, the game console 1008 and/or game content stored on the game medium 1012 are configured to output information regarding the play of the current game through an interface, for example, to a separate information collection unit 1016 and/or directly to a data processor 1020, such as the central facility 211 of FIG. 2. In the case of an external collection unit 1016 (e.g., implemented via the video game monitor 128 and/or the home unit 124 of FIG. 1), the collection unit 1016 could be connected to a standard port of the game console 1008 and/or may be coupled to an existing device already coupled to an interface port of the game console 1008. For example, video game producers could cause the play of the game stored on the game medium 1012 to directly output metering data via a predetermined game console interface port (e.g. one or more of the external interface ports 316 of the example game console 304 of FIG. 3). Game console manufacturers could add similar capability to game consoles 1008 to output such information based on game play without the need to modify the game content stored on the game medium 1012. Additionally, the game console 1008 may be configured to block the reporting of metering data/information unless instructed to do so by the collection unit 1016 (e.g., the video game monitor 128) and/or the data processor 1020 (e.g., the central facility 211). An example software meter that could be adapted for use in the example systems herein is described in, for example, PCT Application Serial No. PCT/US98/14286, entitled "Audience Measurement System for Digital Television" and filed on May 12, 1998. PCT Application Serial No. PCT/US98/14286 is hereby incorporated by reference in its entirety.

Figure 11:
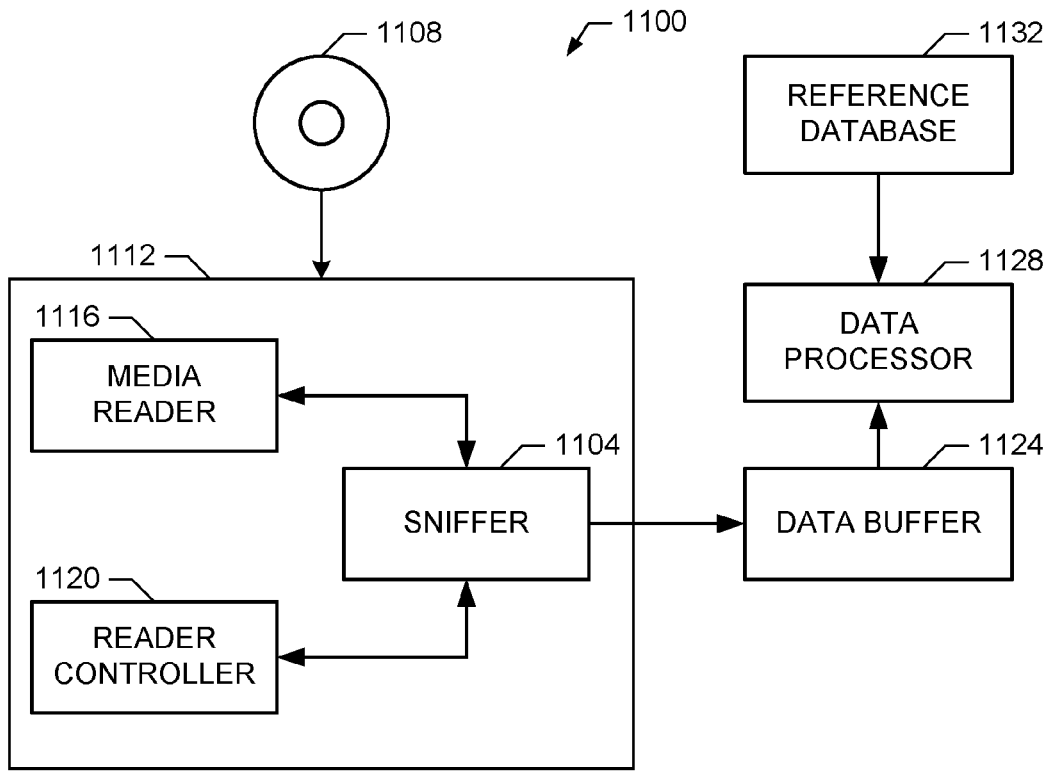
FIG. 11 is a block diagram of an example video game monitoring system based on game medium access mapping.

FIG. 11 is a block diagram of an example video game monitoring system 1100 which employs game medium access mapping to monitor video game usage. In this example, a storage device analyzer 1104 (also known as a storage device "sniffer") is used to monitor accesses of the game storage medium 1108 (e.g., CD-ROM, hard disk, cartridge) made by the game console 1112. For example, the storage device analyzer 1104 may be coupled between the physical media reader 1116 and the reader controller 1120 of the game console 1112 to copy and record the memory addresses requested by the controller 1120. In the case of a game console 1112 for use with a game disk 1108 (e.g., CD-ROM), the storage device analyzer 1104 may be coupled between a CD reader arm 1116 in the game console 1112 and a corresponding reader arm controller 1120 (e.g., a special purpose microcontroller) in the game console 1112 to copy and record the coordinates of the disc requested by the controller 1120. In such a configuration, the storage device analyzer 1104 may determine the CD track and/or sector that the reader arm controller 1120 is commanding the reader arm 1116 to access. In the case of a game console 1112 for use with a game cartridge 1108, the storage device analyzer 1104 may be coupled between the game cartridge 1108 and a corresponding game console cartridge port (e.g., the game port 324 of the example game console 304 of FIG. 3) to copy and record the addresses of the cartridge memory cells accessed by the game console 1112.

In either of the two previous examples, a pattern of memory accesses at the startup of the game may be used as a reference identifier (or memory "signature") to determine the identity of the game being played. Moreover, the game location and the current game content being presented to the user may also be determined based on cross-referencing the accessed memory locations to a reference memory map corresponding to the game medium 1108 of the monitored video game. Therefore, the example system 1100 includes a data buffer 1124 to store the output of the storage device analyzer 1104 and provide such output to a data processor 1128 (such as the central facility 211 of FIG. 2). The data processor 1128 analyzes the information provided by the storage device analyzer 1104, for example, to determine the memory signature corresponding to the game being played. The data processor 1128 may compare the processed information from the storage device analyzer 1104 to a corresponding set of information in a reference database 1132 to determine, for example, the identity of the game based on the memory signature, the presented game content based on the memory locations accessed by the reader controller 1120/media reader 1116, etc.

For the case of a game disk 1108, in addition to looking at the memory locations being accessed, it may be possible to examine (via a positioning sensor) the control arm 1116 of the CD drive unit to determine its positioning relative to the disk 1108. This relative position may be cross-referenced against a physical layout of the disk 1108 to determine the content being accessed at any given time.

Figure 12:
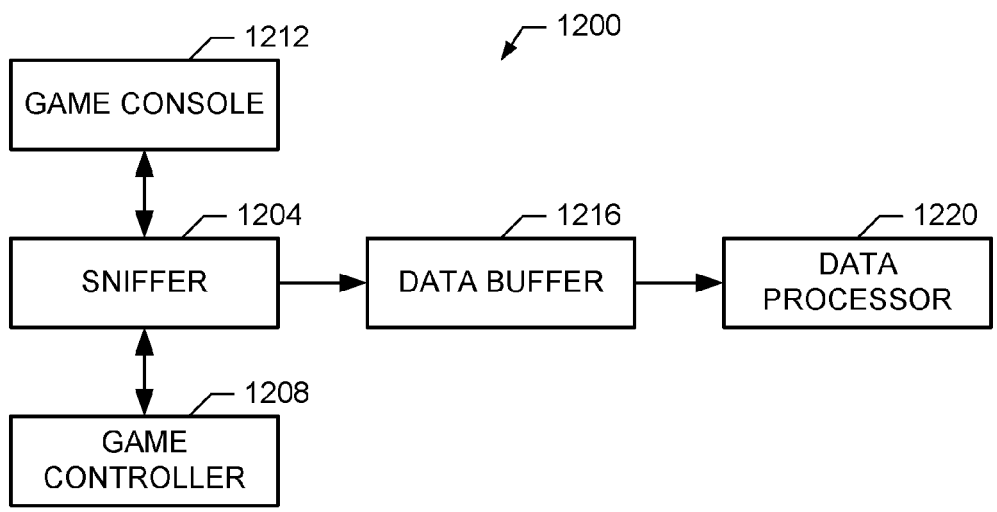
FIG. 12 is a block diagram of an example video game monitoring system based on game controller monitoring.

FIG. 12 illustrates a block diagram of an example video game monitoring system 1200 which employs game controller monitoring to monitor video game usage. In the example system 1200, a game controller analyzer 1204 (also known as a game controller "sniffer") may be coupled between a game controller 1208 and a corresponding game port (e.g., the port 312 of the example game console 304 of FIG. 3) of the video game console 1212. The game controller sniffer 1204 output is provided to a data buffer 1216 for storage and transmission to a data processor 1220 (such as the central facility 211 of FIG. 2). The data processor 1220 may use the results provided by the game controller sniffer 1204 to determine, for example, whether the game is being played based on monitoring the activity between the game controller 1208 and the game console 1212. The data processor 1220 may also combine game controller activity with other memory/bus sniffer information to determine, for example, the identity of the game currently being played. U.S. Pat. No. 5,488,408 and PCT Application Serial No. PCT/US2002/038012, discussed above and incorporated herein, describe example memory/bus sniffers that could be adapted for use as game controller sniffers for use in the example systems described herein.

Figure 13:
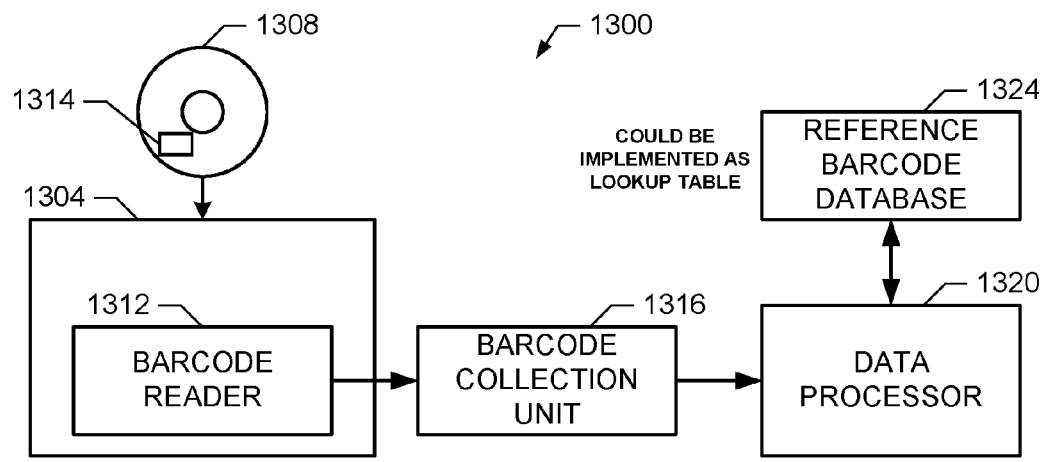
FIG. 13 is a block diagram of a first example video game monitoring system based on game medium visual image scanning.
Figure 14:
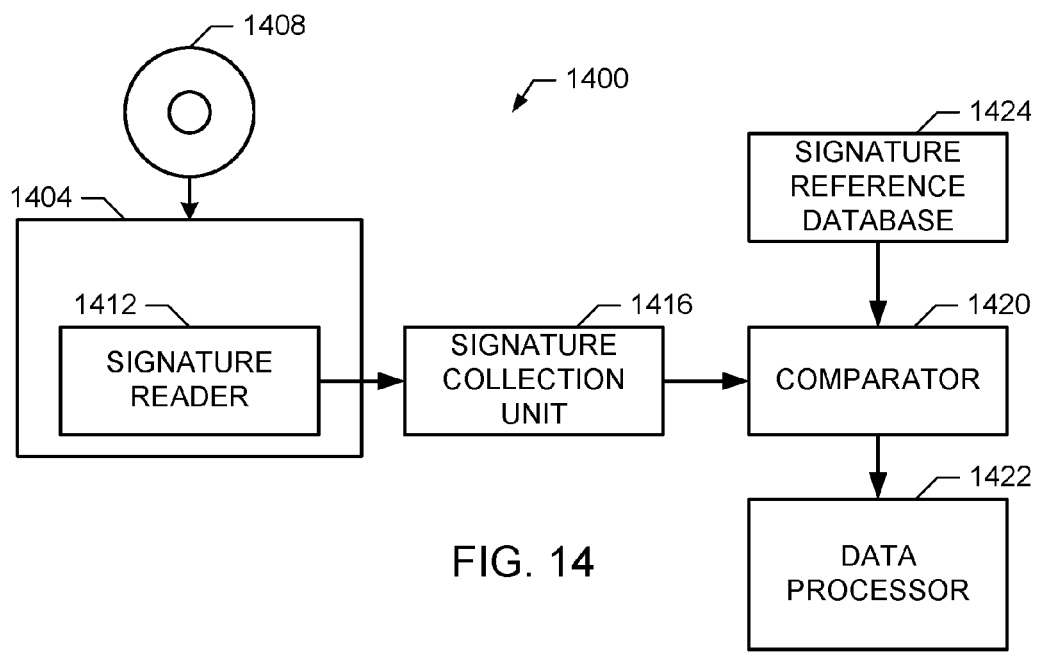
FIG. 14 is a block diagram of a second example video game monitoring system based on game medium visual image scanning.

FIGS. 13 and 14 are block diagrams of example video game monitoring systems 1300 and 1400 which employ game medium visual image scanning to monitor video game usage. In the case of game consoles for use with game disks (e.g., CD-ROMs), an optical sensor may be placed inside the game console and positioned to read the top of the disk when the disk is inserted into the game console. In the case of game consoles for use with game cartridges, an adaptor device may be coupled between the game cartridge and the game console cartridge port. The adaptor device may include an optical sensor to read a side of the cartridge when the cartridge is inserted into the adaptor device. In either example system, the optical sensor may be configured, for example, to read a code attached to the top of the disk (such as a barcode in the example system of FIG. 13). Additionally or alternatively, the optical sensor may be configured to read an image embossed on the top/side of the disk/cartridge and transform such image into a "game medium visual signature" (as in the example system of FIG. 14). A game medium visual signature may be represented, for example, as a sequence of data generated by sampling an image embossed on the game medium at a set of predetermined locations. If the game medium is a game disk (e.g., CD-ROM), the "disk" visual signature may also be based on a predetermined sampling rate use to sample the image embossed on the spinning disk. In any case, the processed barcode and/or generated game medium visual signature may be used to cross-reference a library of such barcodes/signatures to look-up the identity of the game from a database/look-up table.

Turning to FIG. 13, the example system 1300 illustrated therein includes a game console 1304 for playing a game stored on a game medium 1308. The game console 1304 is provided with a barcode reader 1312 to read a barcode 1314 placed on the game medium 1308. The game console 1304 is coupled to a barcode collection unit 1316 to receive the output of the barcode reader 1312. The barcode collection unit 1316 may be included, for example, in a game monitor, such as the game monitor 128 of FIG. 1, which may be coupled to the game console 1304 via a device interface, such as the device interface 150. The barcode collection unit 1316 may instead be a separate device coupled to the game console 1304 via an external interface port of the game console 1304, such as the external interface ports 316 of the example game console 304 of FIG. 3. In any case, the barcode collection unit 1316 sends the read barcode information to a data processor 1320, such as the central facility 211 of FIG. 2. In the example system 1300, the data processor 1320 uses the barcode information to index a reference barcode database 1324 to determine the identity of the game currently being played on the game console 1304. Alternatively or additionally, based on the density of the barcode 1314, the data processor 1320 may be able to determine the game identity, manufacturer, etc. directly from the barcode information without the reference barcode database 1324. Additionally, the data processor 1320 may provide the read barcode information to the reference barcode database 1324, for example, to allow a previously unidentified barcode 1314 to be added to the database.

Turning to FIG. 14, the example system 1400 illustrated therein includes a game console 1404 for playing a game stored on a game medium 1408. The game console 1404 is provided with a visual signature reader 1412 to determine a game medium visual signature corresponding to the game medium 1408. As discussed above, the visual signature reader 1412 may construct such a signature based on, for example, scanning an image embossed on the game medium 1408 or sampling an image embossed on the game medium 1408 at a predetermined rate. The game console 1404 is coupled to a visual signature collection unit 1416 to receive the output of the visual signature reader 1412. The visual signature collection unit 1416 may be included, for example, in a game monitor, such as the game monitor 128 of FIG. 1, which may be coupled to the game console 1404 via a device interface, such as the device interface 150. The visual signature collection unit 1416 may instead be a separate device coupled to the game console 1404 via an external interface port of the game console 1404, such as the external interface ports 316 of the example game console 304 of FIG. 3. In either example case, the visual signature collection unit 1416 sends the generated signature to a combination of a comparator 1420 and data processor 1422, which may be implemented in the central facility 211 of FIG. 2. In the example system 1400, the comparator cross-references the generated game medium visual signature with a reference signature database 1424 that includes a set of reference signatures corresponding to a set of games to be monitored. If a match is found, the data processor 1422 uses the reference game medium visual signature that matches the generated game medium visual signature to, for example, identify the game currently being played by the game console 1404, etc.

Figure 15:
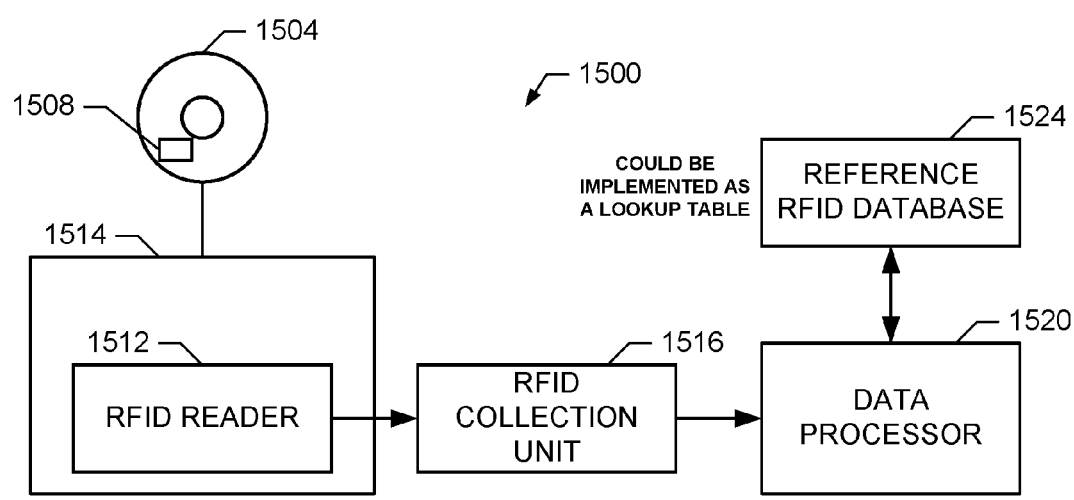
FIG. 15 is a block diagram of an example video game monitoring system based on RFID tagging of a game medium.

FIG. 15 illustrates a block diagram of an example video game monitoring system 1500 based on RFID tagging of a game medium 1504. In the example system 1500, an RFID tag 1508 is placed on the game medium 1504 (e.g., disk or cartridge). In one example, an RFID reader 1512 may be coupled to or included in a game console 1514. In another example, the RFID reader 1512 may be coupled to or included in a video game monitor (e.g., the video game monitor 128 of FIG. 1). The RFID reader 1512 is configured to detect the presence and identity of the game medium 1504 based on the reception of information from the RFID tag 1508.

In the example system 1500, the RFID reader 1512 is included in the game console 1514. The game console 1514, in turn, is coupled to an RFID collection unit 1516 to receive the output of the RFID reader 1512. The RFID collection unit 1516 may be included, for example, in a game monitor, such as the game monitor 128 of FIG. 1, which may be coupled to the game console 1514 via a device interface, such as the device interface 150. The RFID collection unit 1516 may instead be a separate device coupled to the game console 1514 via an external interface port of the game console 1514, such as the external interface ports 316 of the example game console 304 of FIG. 3. In any case, the RFID collection unit 1516 sends the detected RFID information to a data processor 1520, such as the central facility 211 of FIG. 2. In the example system 1500, the data processor 1520 uses the RFID information to index a reference RFID database 1524 to determine the identity of the game currently being played on the game console 1514. Alternatively or additionally, based on the memory size of the RFID tag 1508, the data processor 1520 may be able to determine the game identity, manufacturer, etc. directly from the RFID information without the reference barcode database 1524. Additionally, the data processor 1520 may provide the RFID information to the reference RFID database 1524, for example, to allow a previously unidentified RFID tag 1508 to be added to the database.

Due to the motion associated with placing the game medium 1504 (e.g., disk or cartridge) into the game console 1514, low cost, low-power inductive RFID systems may be used to implement the RFID tag 1508 and the RFID reader 1512. As the game medium 1504 is inserted into the game console 1514, the motion of the RFID tag 1508 through a magnetic field generated by the RFID reader 1512 will energize the RFID tag 1508, thereby allowing the tag to transmit information to the RFID reader 1512. In the case of the game medium 1504 being a game disk 1504, the spinning of the disk 1504 in the game console 1514 (especially upon startup) may induce an electric field in the RFID tag 1508 as it passes through a magnetic field generated by the RFID reader 1512, thereby allowing the RFID tag 1508 to transmit its information to the RFID reader 1512.

Figure 16:
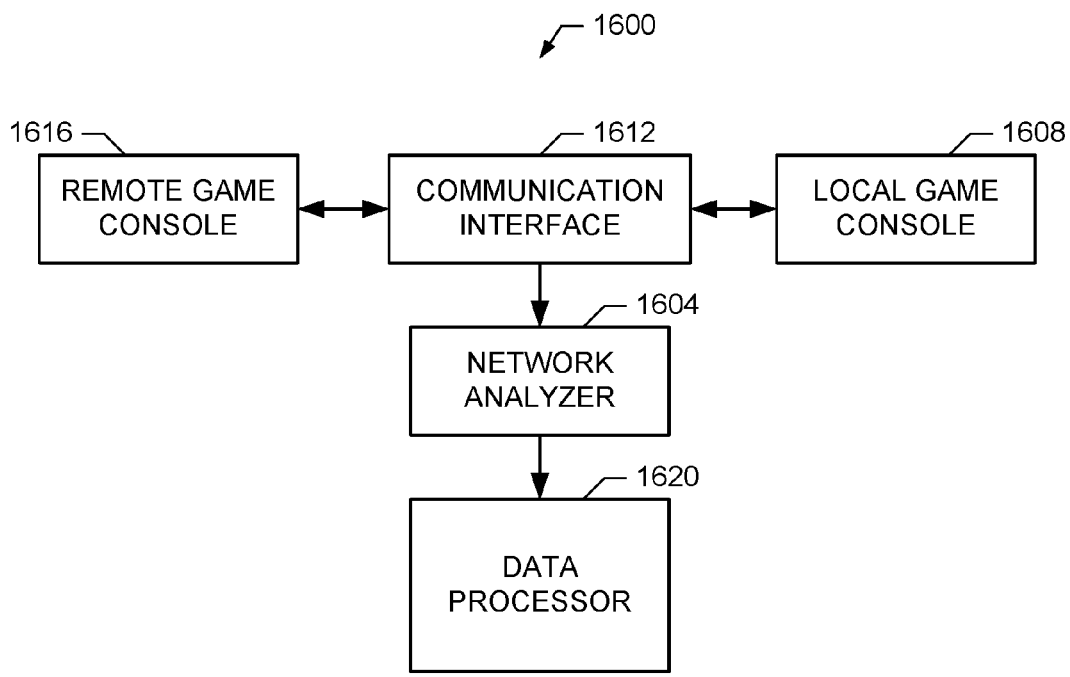
FIG. 16 is a block diagram of an example video game monitoring system based on network communication monitoring.

FIG. 16 illustrates a block diagram of an example video game monitoring system 1600 which employs network communication monitoring. A network analyzer 1604 (also known as a network "sniffer"), such as any well-known suitably-adapted network analyzer, may be coupled to a local game console 1608 to monitor information transferred over a communications interface 1612 between the monitored game console 1608 and another game console 1616 and/or a communications network (e.g., the Internet). The monitored information may be used by a data processor 1620, such as the central facility 211 of FIG. 2, to determine the identity of the game, as well as the game content that is currently active within the game. Information about the number of players, their location and/or their identities may also be determined by the data processor 1620. For example, the data processor 1620 may decode the communication packets (e.g., IP packets) transferred over the communication interface 1612 to determine text data stored therein that identifies the title of the game, the network identities (e.g., network addresses) corresponding to the game consoles 1608, 1616 (and, thus, the game users), the content that is currently active (e.g., a game level or map), etc.

Figure 17:
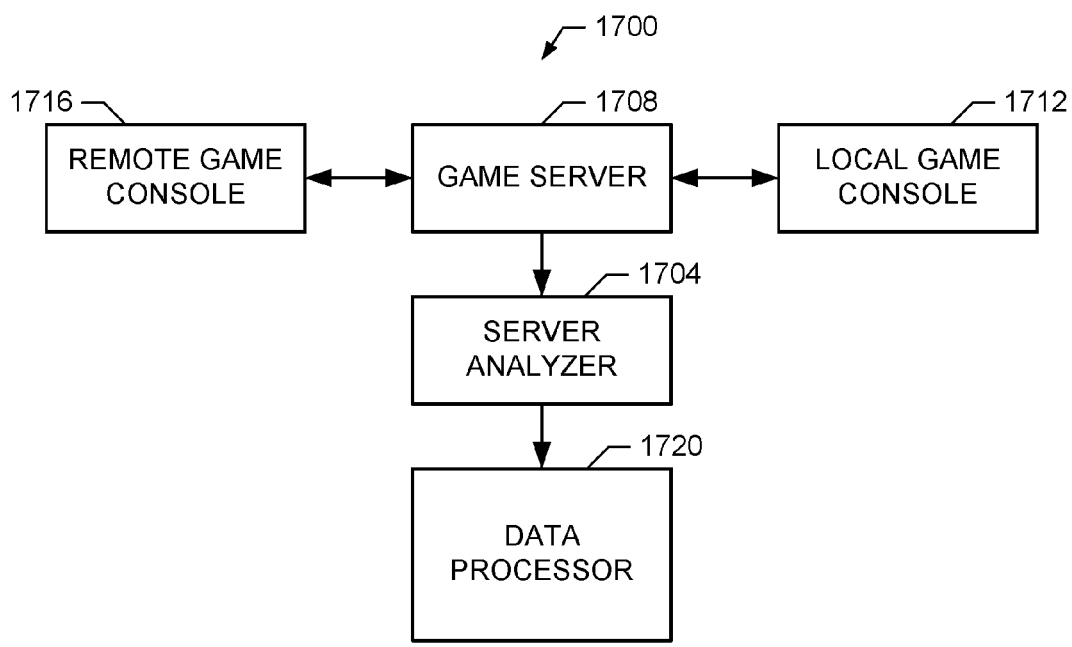
FIG. 17 is a block diagram of an example video game monitoring system based on server-side monitoring.

FIG. 17 illustrates a block diagram of an example video game monitoring system 1700 which employs server-side monitoring to monitor game usage. A server analyzer 1704 may be coupled to an authentication server 1708 and/or a game server 1708 for games that are played over private networks and/or over the Internet. The server analyzer 1704 may be used to monitor the information transferred between the game server 1708 and a local game console 1712. Alternatively or additionally, the server analyzer 1704 may be used to monitor the information transferred between the game server 1708 and one or more remote game consoles 1716. The monitored information may be used by a data processor 1720, such as the central facility 211 of FIG. 2, to determine the identity of the game, as well as the game content that is currently active within the game. Information about the number of players, their location and/or their identities may also be determined by the data processor 1720. For example, the server analyzer 1704 could be configured to receive and process information from a software meter running in the game server 1708 that is similar to a software meter designed to run in a game console (e.g., software meter 1004 of FIG. 10). Alternatively, the game server 1704 could be configured to send metering data directly to the data processor (e.g., the central facility 211) without the need for a server analyzer 1704.

Figure 18:
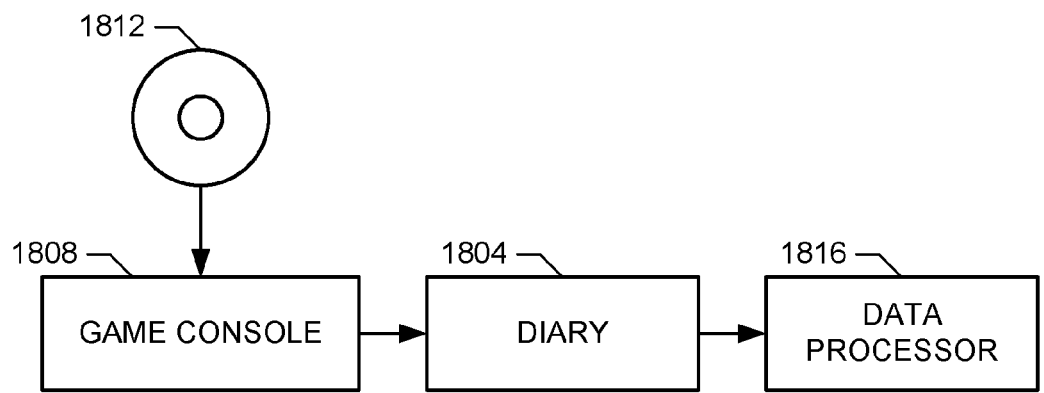
FIG. 18 is a block diagram of an example video game monitoring system based on a diary.

FIG. 18 illustrates a block diagram of an example video game monitoring system 1800 which employs a diary 1804 to monitor video game usage. The example system includes a game console 1808 for playing a game stored on a game medium 1812. The diary 1804 may be a written diary 1804 and/or an electronic diary 1804. The diary 1804 could be customized to exhibit a preference for games owned by a selected user (e.g., by configuring the diary to present a first menu of entries corresponding to only the owned games) and have a fallback capability to support additional games not previously identified as belonging to the user's collection (e.g., by configuring the diary to present a second, generic menu of entries corresponding to non-owned games). The contents of the diary 1804 are then provided to a data processor 1816, such as the central facility 211 of FIG. 2, for processing and crediting.

Figure 19A:
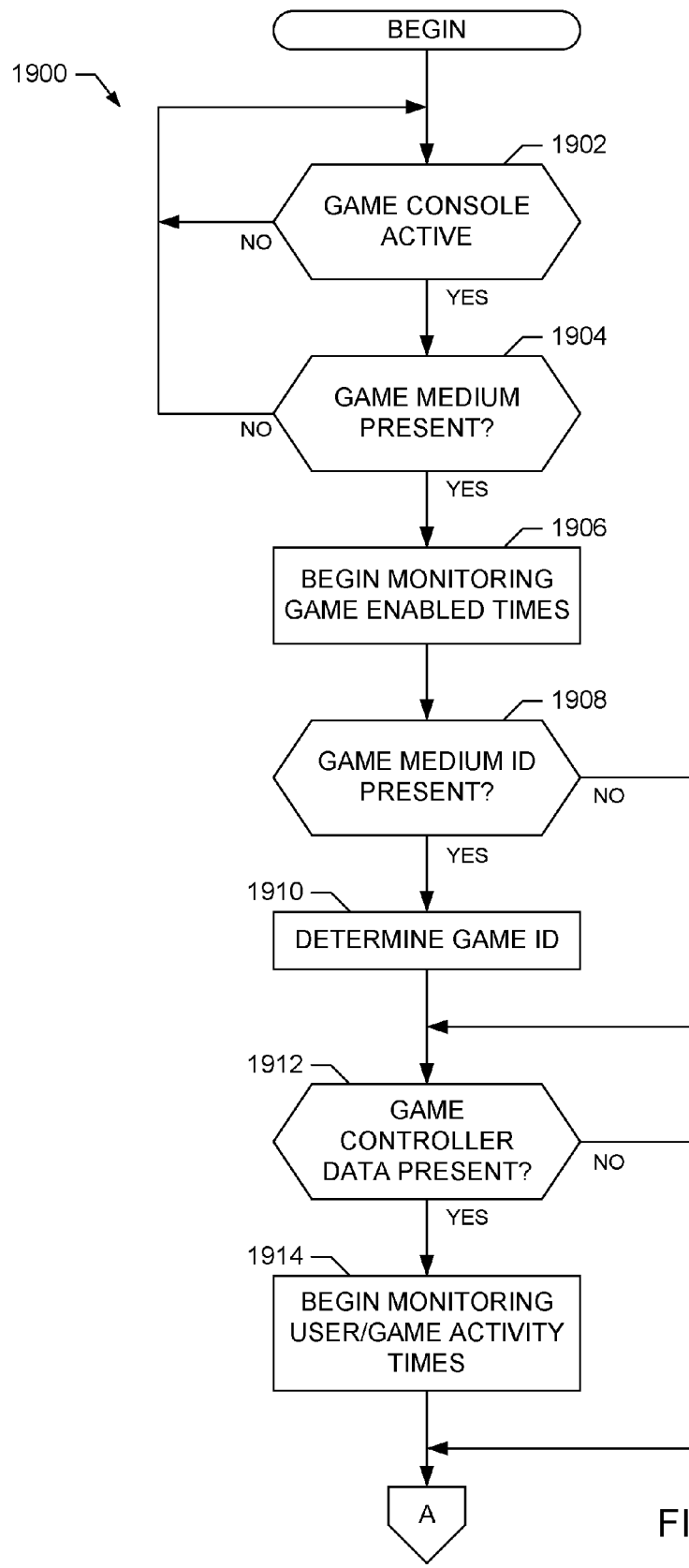
FIGS. 19A-19C are a flowchart representative of example machine readable instructions that may be executed to implement the video game monitor and at least portions of the home unit of FIG. 1.
Figure 19B:
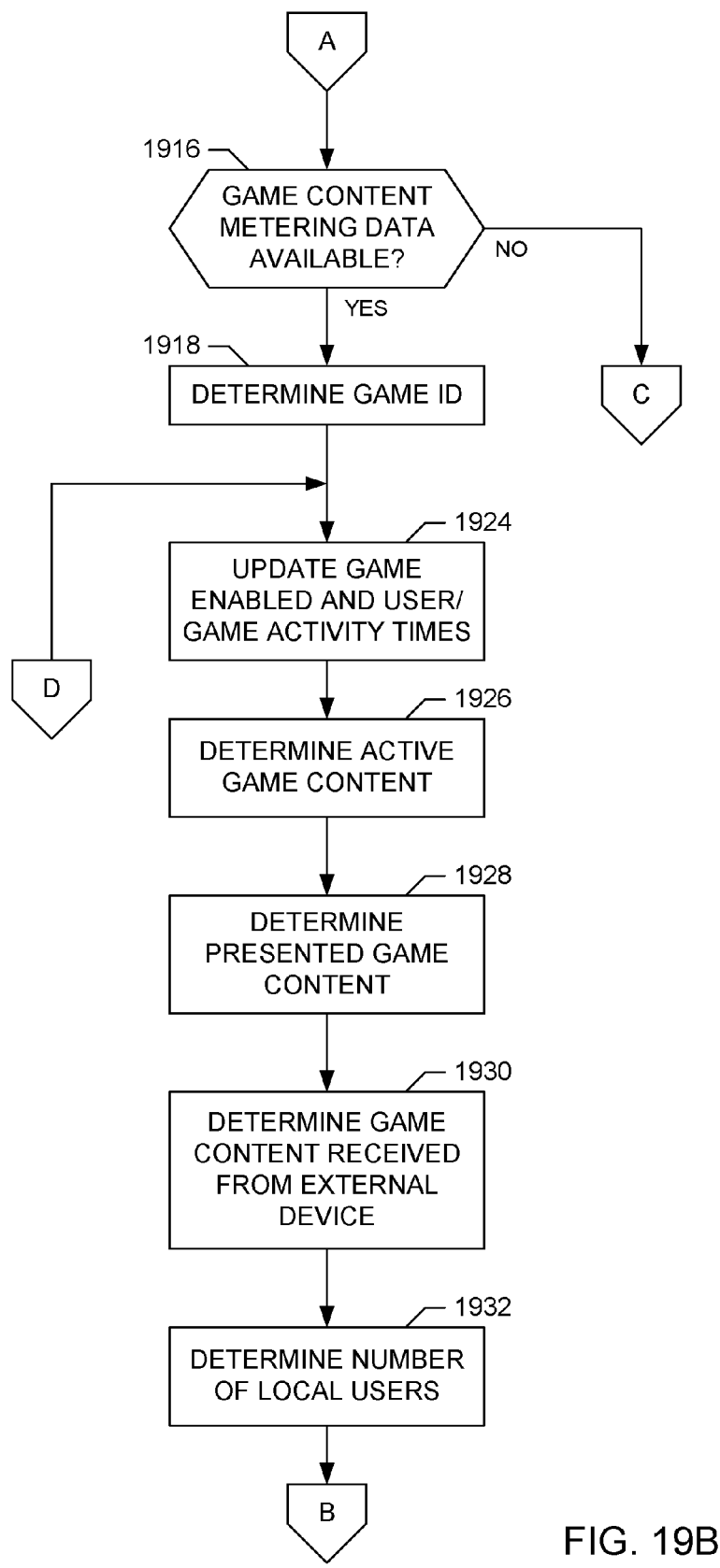
Figure 19C:
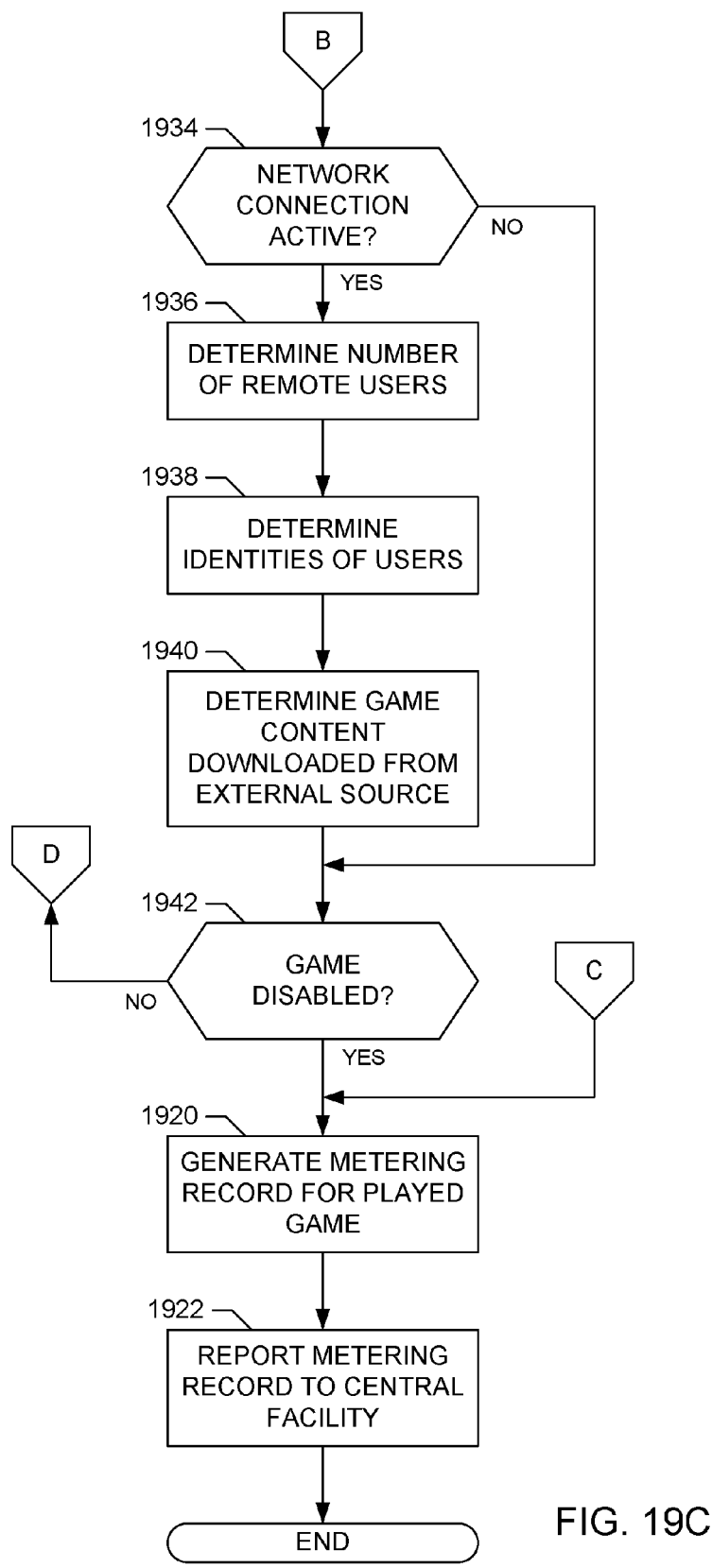

A flowchart representative of example machine readable instructions for implementing the video game monitor 128 and at least portions of the home unit 124 of FIG. 1 is shown in FIGS. 19A-19C. In this example, the process represented by the flowchart may be implemented by a set of machine readable instructions that may comprise one or more programs for execution by a processor, such as the processor 2112 shown in the example computer 2100 discussed below in connection with FIG. 21. The one or more programs may be embodied in software stored on a tangible medium such as a CD-ROM, a floppy disk, a hard drive, a DVD, or a memory associated with the processor 2112, but persons of ordinary skill in the art will readily appreciate that the entire program and/or portions thereof could alternatively be executed by a device other than the processor 2112 and/or embodied in firmware or dedicated hardware in a well-known manner. For example, any or all of the video game monitor 128 and the home unit 124 could be implemented by any combination of software, hardware, and/or firmware. Further, although the example programs are described with reference to the flowchart illustrated in FIGS. 19A-19C, persons of ordinary skill in the art will readily appreciate that many other methods of implementing the example methods and apparatus described herein may alternatively be used. For example, with reference to the flowchart illustrated in FIGS. 19A-19C, the order of execution of the blocks may be changed, and/or some of the blocks described may be changed, eliminated, combined and/or subdivided into multiple blocks.

An example program 1900 to implement the video game monitor 128 and the home unit 124 (or portions thereof) of FIG. 1 is shown in FIGS. 19A-19C. The program 1900 may be executed on a periodic basis (e.g., at fixed time intervals via a program loop) or may be executed in response to a change in state of one or more devices in the home entertainment system 102 and/or the local metering system 100 of FIG. 1. The example program 1900 begins at block 1902 of FIG. 19A at which the video game monitor 128 determines if the video game console 112 is active, for example, based on one or more inputs from the sensors 156 (e.g., a sensor to detect a power-on LED of the video game console 112, a game controller analyzer 1204 to detect that a game controller 1208 has been activated, a current meter to determine that the game console 112 is drawing power, etc.). If the video game console 112 is active (block 1902) control proceeds to block 1904. Otherwise, control returns to block 1902 causing the program 1900 to iterate at block 1902 until the video game console 112 becomes active.

At block 1904, the video game monitor 128 determines whether a game medium (e.g., disk or cartridge) has been inserted into the video game console 112. The video game monitor 128 may make this determination based on, for example, game medium visual image scanning using a barcode reader (e.g., the barcode reader 1312 of FIG. 13) and/or a memory signature reader (e.g., the memory signature reader 1412 of FIG. 14). Additionally or alternatively, the video game monitor 128 may use an RFID reader (e.g., the RFID reader 1512 of FIG. 15) to read an RFID tag, if present, placed on the game medium. The video game monitor 128 and/or the home unit 124 could also determine the presence of a game medium based on monitoring the display of the television 120, for example, for the presence of ancillary codes and/or signatures indicative of displayed game content. If the video game monitor 128 determines that a game medium has been inserted into the game console 112

(block 1904), control proceeds to block 1906. Otherwise, control returns to block 1902 causing the program 1900 to iterate at block 1902 and 1904 until the game medium is inserted in the game console 112.

If the game console 112 is active (block 1902) and the game medium is present (block 1904), control proceeds to block 1906 at which the video game monitor 128 may initiate the monitoring of times associated with the enablement (e.g., power ON) of the video game console 112 and/or the presence of a game medium in the game console 112. Next, control proceeds to block 1908 at which the video game monitor 128 determines whether sufficient information is available to identify the current game (e.g., based on information determined at block 1904, such as a barcode, a memory signature compared to a reference signature, an RFID tag, etc.). If sufficient identification (ID) information is available (block 1908), control proceeds to block 1910 at which the video game monitor 128 determines the game ID and includes such ID in the metering record corresponding to the current game. After the processing at block 1910 completes or if no game ID information is present (block 1908), control proceeds to block 1912.

At block 1912, the video game monitor 128 determines if any user/player input is being provided to the video game console 112 via a game controller, such as the game controller 1208 of FIG. 12. Such information may be determined, for example, by monitoring the game controller interface via a game controller analyzer 1204, by monitoring the internal memory/bus of the video game console 112 via a memory/bus analyzer 904 and/or from information provided by a software meter 1004, as described previously in connection with FIGS. 12, 9 and 10, respectively. User input information may be used to indicate that the video game is actively being played rather than in a demo mode of operation. As such, if game controller data is detected (block 1912), control proceeds to block 1914 at which the video game monitor 128 begins monitoring a set of times associated with active game use (e.g., game start, game pause, game resume, etc.). After processing at block 1914 completes, or if game controller data is not detected (block 1912), control proceeds to block 1916 of FIG. 19B.

At block 1916, the video game monitor 128 determines if game content is accessible and, thereby, supporting the generation and/or determination of the corresponding metering data. If such game content is available (block 1916), control proceeds to block 1918. For example, the video game monitor 128 may determine that access to game content data is possible based on the presence of any or all of the following: data provided by one or ports, such as ports 316 of FIG. 3, from the game console 112; data from one or more sensors 156 monitoring the presented game content; data from a memory/bus analyzer, such as the memory/bus analyzer 904 of FIG. 9; data from a network analyzer, such as the network analyzer 1604 of FIG. 16, data from a server analyzer, such as the server analyzer 1704 of FIG. 17; etc. If the game content is not accessible (block 1916) and, thus, no additional metering data may be generated/determined, control proceeds to block 1920 of FIG. 19C at which the video game monitor 128 generates one or more metering reports that include the metering data generated/determined at the preceding blocks of the example program 1900. Control then proceeds to block 1922 at which the video game monitor 128 and/or the home unit 124 sends the metering report(s) to a central facility, such as the central facility 211 of FIG. 2, for processing and subsequent crediting of the current game based on the provided metering reports. The example program 1900 then ends.

If access to game content data is available as determined at block 1916, control proceeds to block 1918 at which the video game monitor 128 determines the game ID corresponding to the current game. The video game monitor 128 may make this determination based on, for example, reading memory locations in the game console 112 via a memory/bus analyzer 904 to identify data corresponding to the title of the current game, decoding an embedded ancillary code (audio and/or video) from game content presented via the television 120 and detected/measured via one or more sensors 156 (e.g., a microphone, an OSDR, etc.), etc. The game ID determined at block 1918 may be in addition to the game ID determined at block 1910 such that both IDs may be used to cross-validate the game ID determined for the current game. After processing at block 1918 completes, control proceeds to block 1924.

At block 1924, the video game monitor 128 uses the available game content data to refine and/or update the set(s) of monitored times corresponding to game console enablement, active game use, etc. The video game monitor 128 may refine and/or update such set(s) of times based on, for example, memory bus transactions monitored via a memory/bus analyzer 904 that correspond to starting, stopping, pausing and/or resuming the currently played game, decoding ancillary codes and/or determining content signatures that indicate a change in game activity (e.g., a code and/or signature that does not change over a predetermined period of time may be used to indicate that the game is paused), etc. After processing at block 1924 complete, control proceeds to blocks 1926 and 1928.

At blocks 1926 and 1928, the video game monitor 128 determines/generates metering data corresponding to the active game content and the presented game content, respectively. As discussed above, presented game content corresponds to contact that is actually presented to the user, e.g., visually and/or audibly. Active game content corresponds to game content that may be locally cached by the video game console 112 for possible use and/or presentation to the user. Thus, presented game content may be considered a subset of active game content. At block 1926, the video game monitor 128 may determine the active game content, for example, by monitoring the data stored in a cache of the video game console 112 via a memory/bus analyzer 904; by processing the information provided by a software meter, such as the software meter 1004 of FIG. 10; by determining the memory location accessed by the game console 112 via a storage device analyzer, such as the storage device analyzer 1104 of FIG. 11, etc. Additionally or alternatively, at block 1928 the video game monitor 128 and/or the home unit 124 may decode ancillary codes, generate content signatures and/or generate content trends that correspond to the presented game content (and, thus, the active game content as well). After the processing at blocks 1926 and 1928 completes, control proceeds to block 1930.

At block 1930, the video game monitor 128 determines whether any game content has been received by an external, local device (e.g., a memory card) and monitors such content if present. The video game monitor 128 may make this determination by, for example, monitoring game content storage locations in a memory of the video game console 112 via a memory/bus analyzer 904 and/or by processing content source information provided by a software meter, such as the software meter 1004 of FIG. 10. Control then proceeds to block 1932 at which the video game monitor 128 determines the number of local users playing the current game. The video game monitor 128 may make this determination by, for example, monitoring the number of active game controllers via one or more game controller analyzers 1204, monitoring game controller transactions on an internal bus of the video game console 112 via a memory/bus analyzer 904 and/or by processing game controller information provided by a software meter 1004. Control then proceeds to block 1934 of FIG. 19C.

At block 1934 of FIG. 19C, the video game monitor 128 (via, for example, a network analyzer, such as the network analyzer 1604 of FIG. 16) and/or the central facility 211 (via, for example, information received from a server analyzer, such as the server analyzer 1704 of FIG. 17) determines whether a network connection is in use by the game console 112. If a network connection is active (block 1934), control proceeds to blocks 1936 and 1938 at which the video game monitor 128 and/or the central facility 211 determine the number and identities, respectively, of any remote users playing the currently monitored game. The video game monitor 128 and/or the central facility 211 may make such determinations based on the data received by the network analyzer 1604 and/or the server analyzer 1704. Control then proceeds to block 1940 at which the video game monitor 128 and/or the central facility 211 determine whether any game content has been downloaded from an external source (e.g., a remote game server, an Internet web site, etc.) and monitors such content if present. Such a determination may be made from the network analyzer 1604 and/or the server analyzer 1704 discussed above, by a memory/bus analyzer 904 and/or software meter 1004 used to monitor the source of game content, etc. After the processing at block 1940 completes, or if a network connection is not active (block 1934), control proceeds to block 1942.

At block 1942, the video game monitor 128 determines whether the current game has ended (e.g., by removing the game medium, by disabling/turning OFF the game console 112, etc.). If the game has not ended (block 1942) control returns to block 1924 of FIG. 19B and blocks subsequent thereto at which the video game monitor 128, the home unit 124 and/or the central facility 211 continue to monitor the currently played game. If the game has ended (block 1942), control proceeds to block 1920 and subsequent blocks thereto at which metering records are generated and reported to the central facility 211. The processing associated with blocks 1920 and 1922 was already described in detail above and, thus, for brevity is not re-described here.

Figure 20A:
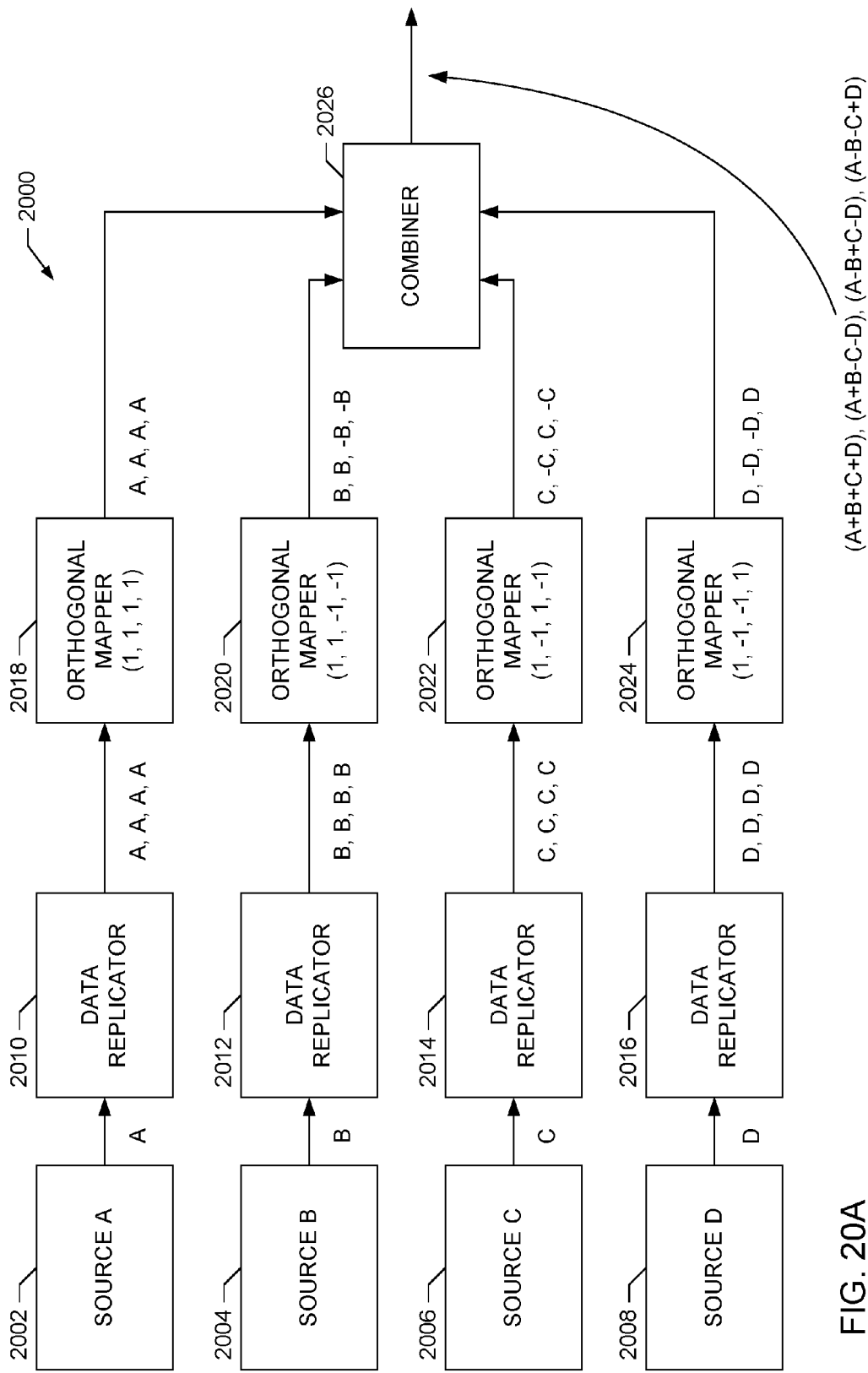
FIGS. 20A-20B are block diagrams of an example encoder and decoder to orthogonally encode data to be embedded as ancillary codes in presented game content.
Figure 20B:
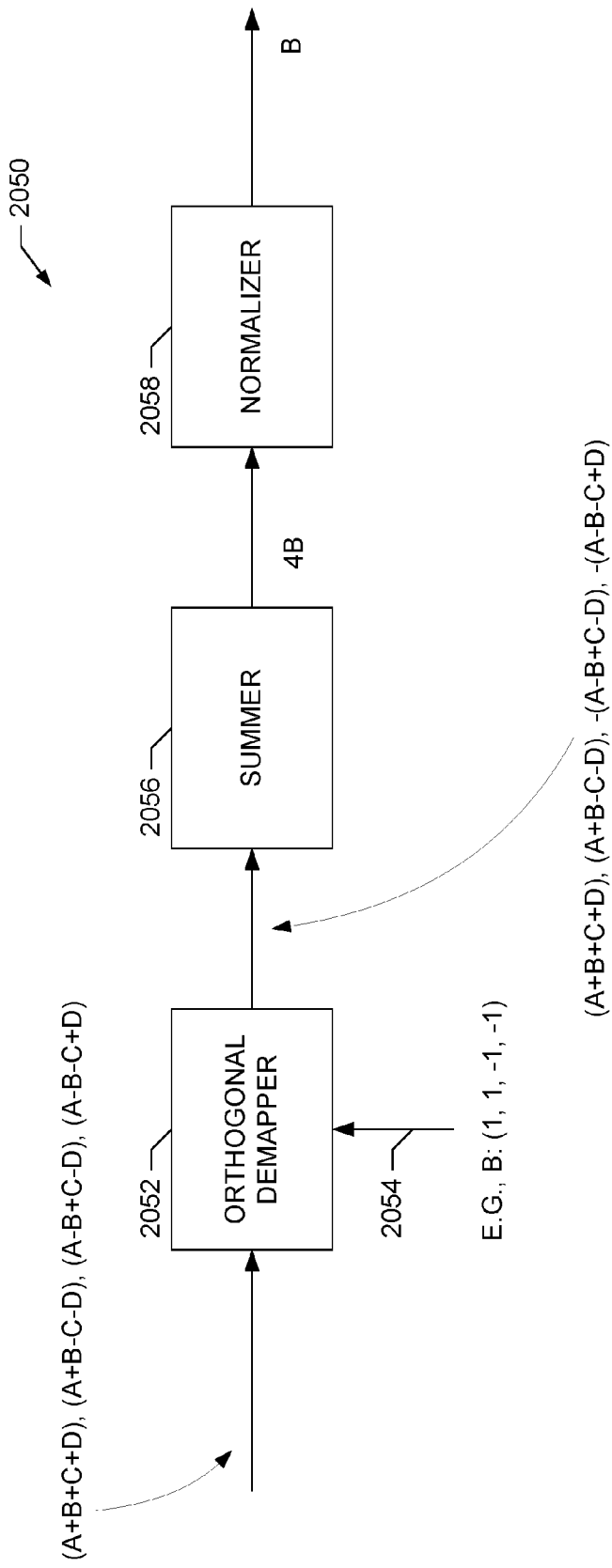

As discussed above, for scenarios in which ancillary codes and/or watermarks are embedded in the game content, the coded data from various audio and/or video sources may be superimposed to create the final audio and/or video output. Thus, in such scenarios, encoding methods that support the uncorrupted decoding of each superimposed code/watermark may be advantageous. Block diagrams of an example encoder 2000 and a corresponding example decoder 2050 for orthogonally superimposing codes from multiple sources are illustrated in FIGS. 20A-20B. The example encoder 2000 of FIG. 20A is configured to orthogonally encode data from four (4) sources 2002, 2004, 2006, 2008. To orthogonally encode the source data, the source data is first replicated by a set of data replicators 2010, 2012, 2014, 2016. The data replicators 2010, 2012, 2014, 2016 are configured to replicate their respective source data inputs a number of times equal to the number of data sources, which is four (4) in the instant example. For example, for source 2004, if the source data has a value of "B," then the output of the corresponding data replicator 2012 is "(B, B, B, B)."

The outputs of the data replicators 2010, 2012, 2014, 2016 are provided to corresponding orthogonal mappers 2018. 2020, 2022, 2024. Each orthogonal mapper 2018. 2020, 2022, 2024 multiplies (or "covers") its input replicated data sequence with a predetermined mapping sequence that is orthogonal to the predetermined mapping sequences for the other orthogonal mappers 2018. 2020, 2022, 2024. For example, the set of predetermined orthogonal mapping sequences used by the orthogonal mappers 2018, 2020, 2022, 2024 of the example encoder 2000 are given by:

Orthogonal mapper 2018: (1, 1, 1, 1)
Orthogonal mapper 2020: (1, 1, −1, −1)
Orthogonal mapper 2022: (1, −1, 1, −1)
Orthogonal mapper 2024: (1, −1, −1, 1).

Thus, for an example scenario in which the source data from the four sources 2002, 2004, 2006, 2008 is A, B, C, and D, respectively, the corresponding outputs of the four orthogonal mappers 2018, 2020, 2022, 2024 are:

(A,A,A,A), (B,B,−B,−B), (C,−C,C,−C) and (D,−D,−D, D).

To create the output of the encoder 2000, the outputs from the orthogonal mappers 2018, 2020, 2022, 2024 are summed by a combiner 2026. Thus, continuing with the example scenario described above, the corresponding, orthogonally encoded output sequence from the encoder 2000 is:

(A+B+C+D), (A+B−C−D), (A−B+C−D), (A−B−C+D).

The example decoder 2500 of FIG. 20B is configured to orthogonally decode an encoded data sequence generated by the corresponding example encoder 2000 of FIG. 20A. The example decoder 2500 may include one or more orthogonal demappers 2052 to multiply (or cover) the input encoded data sequence with a predetermined demapping sequence provided via a reference input 2054 and corresponding to the desired source data to recover. Continuing with the above example, for the case of decoding an original source data B from the source 2004 of FIG. 20A, the corresponding predetermined demapping sequence is (1, 1, −1, −1). One having ordinary skill in the art will recognize that the predetermined demapping sequence is equivalent to the predetermined mapping sequence used by the corresponding orthogonal mapper 2018, 2020, 2022, 2024 to orthogonally encode the desired source data. Thus, for the case of decoding the source data provided by source 2004, the output of the orthogonal demapper 2052 would be:

(A+B+C+D), (A+B−C−D),−(A−B+C−D),−(A−B−C+D).

Next, the output of the orthogonal demapper 2052 is provided to a summer 2056. The summer 2056 adds the individual sequence elements output form the orthogonal demapper 2052 to form a single data output. Continuing with the previous scenario, the output of the summer 2056 corresponding to decoding the source data provided by the source 2004 would be:

(A+B+C+D)+(A+B−C−D)+(A−B+C−D)+(A−B−C+D) =4B.

Finally, the output of the summer 2056 is provided to a normalizer 2058 to yield the output of the example decoder 2050. The normalizer 2058 is configured to scale the output 2056 by a scale factor to compensate for the gain factor resulting from the processing performed by the encoder 2000 and decoder 2050. The scale factor is equivalent to the reciprocal of the number of sources 2002, 2004, 2006, 2008 supported by the example encoder 2000. Thus, in the instant example, the normalizer 2058 applies a scale factor of (¼) to its input. For the example scenario described above, the output of the decoder 2050 corresponding to the source 2004 is B, which is identical to the original source data produced by the source 2004.

One having ordinary skill in the art will appreciate that many other types of encoders and decoders, in addition to or as alternatives to the example encoder 2000 and decoder 2050, may be used to create ancillary codes and/or watermarks that may be superimposed and subsequently recovered. The type of encoder and decoder employed may depend on the number of possible data sources, the type of data to be encoded, the data rate of the data to be encoded, the amount of processing available to decode the ancillary codes, etc.

Figure 21:
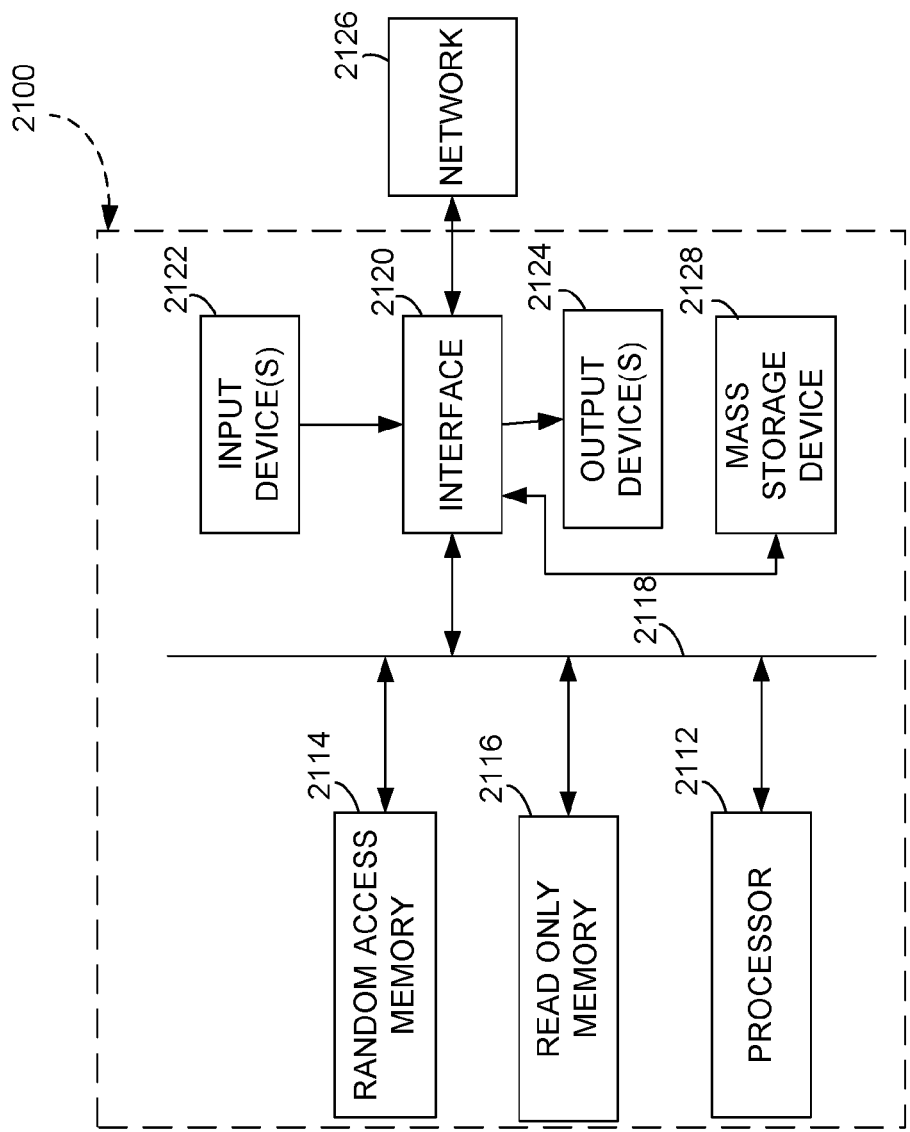
FIG. 21 is a block diagram of an example computer that may execute the machine readable instructions represented in FIGS. 19A-19C.

FIG. 21 is a block diagram of an example computer 2100 capable of implementing the apparatus and methods disclosed herein. The computer 2100 can be, for example, a server, a personal computer, a personal digital assistant (PDA), an Internet appliance, or any other type of computing device.

The system 2100 of the instant example includes a processor 2112. For example, the processor 2112 can be implemented by one or more Intel® microprocessors from the Pentium® family, the Itanium® family or the XScale® family. Of course, other processors from other families are also appropriate. A processor such as processor 2112 may be used to implement any or all of the video game monitor 128 and the home unit 124 (or portions thereof) of FIG. 1 and/or the central facility processor 224 (or portions thereof) of FIG. 2.

The processor 2112 is in communication with a main memory including a volatile memory 2114 and a non-volatile memory 2116 via a bus 2118. The volatile memory 2114 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2116 may be implemented by flash memory and/or any other desired type of memory device. Access to the main memory 2114, 2116 is typically controlled by a memory controller (not shown) in a conventional manner.

The computer 2100 also includes a conventional interface circuit 2120. The interface circuit 2120 may be implemented by any type of well-known interface standard, such as an Ethernet interface, a universal serial bus (USB), and/or a third generation input/output (3GIO) interface.

One or more input devices 2122 are connected to the interface circuit 2120. The input device(s) 2122 permit a user to enter data and commands into the processor 2112. The input device(s) can be implemented by, for example, a keyboard, a mouse, a touchscreen, a track-pad, a trackball, an isopoint and/or a voice recognition system.

One or more output devices 2124 are also connected to the interface circuit 2120. The output devices 2124 can be implemented, for example, by display devices (e.g., a liquid crystal display, a cathode ray tube display (CRT)), by a printer and/or by speakers. The interface circuit 2120, thus, typically includes a graphics driver card.

The interface circuit 2120 also includes a communication device such as a modem or network interface card to facilitate exchange of data with external computers via a network 2126 (e.g., an Ethernet connection, a digital subscriber line (DSL), a telephone line, coaxial cable, a cellular telephone system, etc.). The interface circuit 2120 and the network 2126 may implement the connection 140 of FIG. 1.

The computer 2100 also includes one or more mass storage devices 2128 for storing software and data. Examples of such mass storage devices 2128 include floppy disk drives, hard drive disks, compact disk (CD) drives and DVD drives. The mass storage device 2128 and/or the volatile memory 2114 may be used to store metering data (or the contents thereof) in the video game monitor 128 of FIG. 1 and/or the viewing/metering records in the home unit 124 of FIG. 1.

As an alternative to implementing the methods and/or apparatus described herein in a system such as the device of FIG. 21, the methods and or apparatus described herein may be embedded in a structure such as a processor, a field programmable gate array (FPGA), dedicated circuitry and/or an ASIC (application specific integrated circuit).

From the foregoing, persons of ordinary skill in the art will appreciate that the example methods, apparatus and articles of manufacture described herein allow for monitoring of video game usage. For example, the disclosed example methods, apparatus and articles of manufacture support the generation and/or collection of metering information corresponding to the playing of a video game. Such information may regard any or all of the following: A) the identity of the game being played, B) times at which the game is actively being played (instead of in a demo mode of operation), C) the duration of game play, D) the content (e.g., area, location, level, etc.) that is active (e.g., cached) at a specific point during game play, E) the content (e.g., area, location, level, etc.) that is actually being presented to the user (e.g., displayed and/or audible) at a specific point during game play, F) the identity/identities and/or the number of players who are participating in the game locally and/or remotely, G) whether the game is being played across a communications network (e.g., the Internet, a local area network (LAN), a direct cable connection, a dial-up connection, etc.), H) any content that may have been downloaded to the game from an external source (e.g., a network server, an Internet site, a memory card, etc.), as well as any other information of interest.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A video game monitor including:
    a monitoring device to monitor data interfaces between a plurality of game controllers and game ports of a game console, the monitoring device separate from the game console and the plurality of game controllers; and
    a processor separate from the game console and in communication with the monitoring device, the processor to:
        determine whether the game console is operating a video game in a demonstration mode or an active play mode based on data detected by the monitoring device;
        initiate monitoring during the active play mode of a set of times associated with events including starting the video game, pausing the video game and resuming the video game after the data is detected by the monitoring device; and
        determine a number of active game controllers of the plurality of game controllers in communication with the game console based on the data detected by the monitoring device.

2. The video game monitor of claim 1, wherein the processor is to determine the game console is operating the video game in the active play mode when user input information is detected by the monitoring device.

3. The video game monitor of claim 1, wherein the monitoring device is to be in communication with a first one of the game controllers and a first one of the game ports, and further including:
   a memory buffer to store the data detected by the monitoring device; and
   an interface to transmit the data from the memory buffer to a remote data processor.

4. The video game monitor of claim 1, wherein the processor is to initiate the monitoring of the data interfaces between the game controllers and the game ports of the game console after determining the game console is active and a game medium has been inserted into the game console.

5. The video game monitor of claim 4, wherein the monitoring device is a first monitoring device, and further including:
   a second monitoring device to determine whether the game console is active, the second monitoring device different from the first monitoring device; and
   a third monitoring device to determine whether the game medium has been inserted into the game console, the third monitoring device different from the first monitoring device and the second monitoring device.

6. A method to monitor video game activity, the method comprising:
   monitoring data interfaces between a plurality of game controllers and game ports of a game console with a monitoring device separate from the game console and the plurality of game controllers;
   determining, by executing an instruction with a processor separate from the game console and in communication with the monitoring device, whether the game console is operating a video game in a demonstration mode or an active play mode based on data detected by the monitoring device;
   initiating monitoring during the active play mode of a set of times associated with events including starting the video game, pausing the video game and resuming the video game after the data is detected by the monitoring device; and
   determining, by executing an instruction with the processor separate from the game console and in communication with the monitoring device, a number of active game controllers of the plurality of game controllers in communication with the game console based on the data detected by the monitoring device.

7. The method of claim 6, wherein the determining of whether the game console is operating the video game in the demonstration mode or the active play mode includes determining the game console is operating the video game in the active play mode when user input information is detected by the monitoring device.

8. The method of claim 6, wherein the monitoring device is in communication with a first one of the game controllers and a first one of the game ports, and further including:
   storing the data detected by the monitoring device in a memory buffer; and
   transmitting the data from the memory buffer to a remote data processor.

9. The method of claim 6, further including initiating the monitoring of the data interfaces between the game controllers and the game ports of the game console after determining the game console is active and a game medium has been inserted into the game console.

10. The method of claim 9, wherein the monitoring device is a first monitoring device, and further including:
    determining whether the game console is active using a second monitoring device different from the first monitoring device; and
    determining whether the game medium has been inserted into the game console using a third monitoring device different from the first monitoring device and the second monitoring device.

11. A storage device or storage disk comprising machine readable instructions that, when executed by a processor separate from a game console, cause the processor separate from the game console to at least:
    monitor data interfaces between a plurality of game controllers and game ports of the game console with a monitoring device separate from the game console and the plurality of game controllers;
    determine whether the game console is operating a video game in a demonstration mode or an active play mode based on data detected by the monitoring device;
    initiate monitoring during the active play mode of a set of times associated with events including starting the video game, pausing the video game and resuming the video game after the data is detected by the monitoring device; and
    determine a number of active game controllers of the plurality of game controllers in communication with the game console based on the data detected by the monitoring device.

12. The storage device or storage disk of claim 11, wherein to determine whether the game console is operating the video game in the demonstration mode or the active play mode, the instructions, when executed, cause the processor to determine the game console is operating the video game in the active play mode when user input information is detected by the monitoring device.

13. The storage device or storage disk of claim 11, wherein the instructions, when executed, further cause the processor to initiate the monitoring of the data interfaces between the game controllers and the game ports of the game console after determining the game console is active and a game medium has been inserted into the game console.

14. The storage device or storage disk of claim 13, wherein the monitoring device is a first monitoring device, and the instructions, when executed, further cause the processor to:
    determine whether the game console is active using a second monitoring device different from the first monitoring device; and
    determine whether the game medium has been inserted into the game console using a third monitoring device different from the first monitoring device and the second monitoring device.

* * * * *